(12) United States Patent
Ramezani et al.

(10) Patent No.: US 11,823,477 B1
(45) Date of Patent: Nov. 21, 2023

(54) METHOD AND SYSTEM FOR EXTRACTING DATA FROM TABLES WITHIN REGULATORY CONTENT

(71) Applicant: Moore & Gasperecz Global Inc., Vancouver (CA)

(72) Inventors: Mahdi Ramezani, Vancouver (CA); Ghazal Sahebzamani, Vancouver (CA); Robin Saxifrage, Vancouver (CA); Marcel Jose Guevara, Port Moody (CA)

(73) Assignee: MOORE AND GASPERECZ GLOBAL, INC., Vancouver (CA)

( * ) Notice: Subject to any disclaimer, the term of this patent is extended or adjusted under 35 U.S.C. 154(b) by 0 days.

(21) Appl. No.: 17/898,788

(22) Filed: Aug. 30, 2022

(51) Int. Cl.
```
G06V 30/413    (2022.01)
G06F 40/30     (2020.01)
G06F 40/284    (2020.01)
G06V 30/412    (2022.01)
```

(52) U.S. Cl.
CPC .......... *G06V 30/413* (2022.01); *G06F 40/284* (2020.01); *G06F 40/30* (2020.01); *G06V 30/412* (2022.01)

(58) Field of Classification Search
CPC ....... G06F 40/30; G06F 40/284; G06F 40/279
USPC .................. 382/224–225, 173–180
See application file for complete search history.

(56) References Cited

U.S. PATENT DOCUMENTS

| | | |
|---|---|---|
| 7,571,149 B1 | 8/2009 | Yanosy, Jr. |
| 7,778,954 B2 | 8/2010 | Rhoads et al. |
| 7,823,120 B2 | 10/2010 | Kazakov et al. |
| 8,156,010 B2 | 4/2012 | Gopalakrishnan |
| 8,266,184 B2 | 9/2012 | Liu et al. |
| 8,306,819 B2 | 11/2012 | Liu et al. |
| 8,447,788 B2 | 5/2013 | Liu et al. |

(Continued)

FOREIGN PATENT DOCUMENTS

| | | |
|---|---|---|
| CA | 2256408 C | 12/1997 |
| CA | 2381460 A1 | 2/2001 |

(Continued)

OTHER PUBLICATIONS

Denk T.I. et al., "BERTgrid: Contextualized Embedding for 2D Document Representation and Understanding.," arXiv: Computation and Language, pp. 1-4, 2019.

(Continued)

*Primary Examiner* — Leon Viet Q Nguyen

(57) ABSTRACT

A computer-implemented method for extracting data from a table comprising a plurality of cells is provided. The method comprises: receiving image data representing a physical layout of the table and words or characters in the table; generating a plurality of tokens, each token representing a semantic unit of the words or characters; and generating at least one language embedding and at least one position embedding associated with each token. The method further comprises: associating at least one token with a cell; receiving the tokens at an input of a cell classifier trained to generate a cell classification for each cell based on the language embeddings and the position embeddings of the at least one token associated with the cell; and determining a relationship exists between at least two cells based at least in part on the cell classifications and the position embeddings of the tokens.

20 Claims, 13 Drawing Sheets

(56) References Cited

U.S. PATENT DOCUMENTS

| | | | |
|---|---|---|---|
| 8,510,345 B2 | 8/2013 | Liu et al. | |
| 8,676,733 B2 | 3/2014 | Heisele et al. | |
| 8,693,790 B2* | 4/2014 | Jiang | G06V 30/412 382/209 |
| 8,897,563 B1 | 11/2014 | Welling et al. | |
| 10,013,655 B1 | 7/2018 | Clark | |
| 10,516,902 B1 | 12/2019 | Manoria et al. | |
| 10,565,502 B2 | 2/2020 | Scholtes | |
| 10,853,696 B1 | 12/2020 | Luo et al. | |
| 10,956,673 B1* | 3/2021 | Ramezani | G06V 30/147 |
| 11,005,888 B2 | 5/2021 | Wang et al. | |
| 11,080,486 B2 | 8/2021 | Hao et al. | |
| 11,194,784 B2 | 12/2021 | Brisimi et al. | |
| 11,275,936 B2* | 3/2022 | Neumann | G06F 40/284 |
| 2002/0080196 A1 | 6/2002 | Bornstein et al. | |
| 2004/0039594 A1 | 2/2004 | Narasimhan et al. | |
| 2005/0160263 A1 | 7/2005 | Naizhen et al. | |
| 2005/0188072 A1 | 8/2005 | Lee, IV et al. | |
| 2005/0198098 A1 | 9/2005 | Levin et al. | |
| 2006/0088214 A1* | 4/2006 | Handley | G06V 30/416 382/176 |
| 2006/0117012 A1 | 6/2006 | Rizzolo et al. | |
| 2007/0092140 A1* | 4/2007 | Handley | G06V 30/413 382/176 |
| 2007/0226356 A1 | 9/2007 | Levin et al. | |
| 2008/0216169 A1 | 9/2008 | Naizhen et al. | |
| 2008/0263505 A1 | 10/2008 | StClair et al. | |
| 2010/0153473 A1 | 6/2010 | Gopalan | |
| 2010/0228548 A1 | 9/2010 | Liu et al. | |
| 2011/0258182 A1 | 10/2011 | Singh et al. | |
| 2011/0289550 A1 | 11/2011 | Nakae | |
| 2012/0011455 A1 | 1/2012 | Subramanian et al. | |
| 2013/0236110 A1* | 9/2013 | Barrus | G06V 30/414 382/224 |
| 2016/0042251 A1* | 2/2016 | Cordova-Diba | G06F 16/73 382/199 |
| 2016/0063322 A1* | 3/2016 | Déjean | G06V 30/412 382/176 |
| 2016/0350885 A1 | 12/2016 | Clark | |
| 2017/0235848 A1 | 8/2017 | Van Dusen et al. | |
| 2017/0264643 A1 | 9/2017 | Bhuiyan et al. | |
| 2018/0075554 A1 | 3/2018 | Clark et al. | |
| 2018/0137107 A1 | 5/2018 | Buccapatnam Tirumala et al. | |
| 2018/0197111 A1 | 7/2018 | Crabtree et al. | |
| 2018/0225471 A1 | 8/2018 | Goyal et al. | |
| 2019/0098054 A1 | 3/2019 | Ramachandran et al. | |
| 2019/0147388 A1* | 5/2019 | Alexander | G06V 30/418 705/7.14 |
| 2019/0251397 A1 | 8/2019 | Tremblay et al. | |
| 2019/0279111 A1 | 9/2019 | Merrill et al. | |
| 2019/0377785 A1 | 12/2019 | N et al. | |
| 2020/0004877 A1 | 1/2020 | Ghafourifar et al. | |
| 2020/0019767 A1 | 1/2020 | Porter et al. | |
| 2020/0050620 A1 | 2/2020 | Clark et al. | |
| 2020/0074515 A1 | 3/2020 | Ghatage et al. | |
| 2020/0082204 A1 | 3/2020 | Beaver | |
| 2020/0111023 A1 | 4/2020 | Pondicherry Murugappan et al. | |
| 2020/0125659 A1 | 4/2020 | Brisimi et al. | |
| 2020/0213365 A1 | 7/2020 | Ramachandran et al. | |
| 2020/0233862 A1 | 7/2020 | Shaked et al. | |
| 2020/0279271 A1 | 9/2020 | Gasperecz et al. | |
| 2020/0311201 A1 | 10/2020 | Sainani et al. | |
| 2020/0320349 A1 | 10/2020 | Yu et al. | |
| 2020/0349920 A1 | 11/2020 | Al Bawab et al. | |
| 2021/0089767 A1 | 3/2021 | Ashek et al. | |
| 2021/0117621 A1 | 4/2021 | Sharpe et al. | |
| 2021/0124800 A1 | 4/2021 | Williams | |
| 2021/0209358 A1 | 7/2021 | Alikhani et al. | |

FOREIGN PATENT DOCUMENTS

| | | |
|---|---|---|
| CA | 2410881 A1 | 12/2001 |
| CA | 2419377 A1 | 2/2002 |
| CA | 2699397 A1 | 4/2009 |
| CA | 2699644 A1 | 4/2009 |
| CN | 110705223 A | 1/2020 |
| EP | 2993617 A1 | 3/2016 |
| RU | 2628431 C1 | 8/2017 |

OTHER PUBLICATIONS

Locke, Daniel et al., Automatic cited decision retrieval: Working notes of Ielab for FIRE Legal Track Precedence Retrieval Task, Queensland University of Technology, 2017, pp. 1-2.

Locke, Daniel et al., Towards Automatically Classifying Case Law Citation Treatment Using Neural Networks. The University of Queensland, Dec. 2019, pp. 1-8.

Sadeghian, Ali et al., "Automatic Semantic Edge Labeling Over Legal Citation Graphs", Springer Science+Business Media B.V., Mar. 1, 2018, pp. 128-144.

Young T. et al., "Recent Trends in Deep Learning Based Natural Language Processing [Review Article]," IEEE Computational Intelligence Magazine, vol. 13, No. 3, pp. 1-32, 2018.

Radford A. et al., "Improving Language Understanding by Generative Pre-Training", pp. 1-12, 2018.

Devlin, J. et al. "BERT: Pre-training of Deep Bidirectional Transformers for Language Understanding", arXiv: Computation and Language, pp. 1-17, 2018.

Lan, Z. et al., "ALBERT: A Lite BERT for Self-Supervised Learning of Language Representations", arXiv: Computation and Language, pp. 1-17, 2019.

Liu, Y. et al., "RoBERTa: A Robustly Optimized BERT Pretraining Approach", arXiv: Computation and Language, pp. 2-13, 2019.

Sanh, V. et al., "DistilBERT, a Distilled Version of BERT: smaller, faster, cheaper and lighter", arXiv: Computation and Language, pp. 1-5, 2019.

Lee, J. et al., "BioBERT: a pre-trained biomedical language representation model for biomedical text mining", Bioinformatics, pp. 1-7, 2019.

Peters, M. E. et al., "To Tune or Not to Tune? Adapting Pretrained Representations to Diverse Tasks", arXiv: Computation and Language, pp. 1-8, 2019.

Siblini, C. et al., "Multilingual Question Answering from Formatted Text applied to Conversational Agents", arXiv: Computation and Language, pp. 1-10, 2019.

Lai, A. et al., "Natural Language Inference from Multiple Premises", arXiv: Computation and Language, pp. 1-10, 2017.

Elwany, E. et al.; "BERT Goes to Law School: Quantifying the Competitive Advantage of Access to Large Legal Corpora in Contract Understanding", arXiv: Computation and Language, 2019, pp. 1-4.

Nguyen, T. et al.; "Recurrent neural network-based models for recognizing requisite and effectuation parts in legal texts", Springer Science+Business Media B.V., 2018, pp. 169-199.

Chalkidis, I. et al.; "Deep learning in law: early adaptation and legal word embeddings trained on large corpora", Springer Nature B.V. 2018, pp. 171-198.

Tang, G. et al.; "Matching law cases and reference law provision with a neural attention model", 2016, pp. 1-4.

Kingston, J .; "Using artificial intelligence to support compliance with the general data protection regulation", Springer Science+Business Media B.V., 2017 pp. 429-443.

Fatema et al.; "A Semi-Automated Methodology for Extracting Access Control Rules from the European Data Protection Directive", IEE Computer Society, 2016, pp. 25-32.

Mandal, S. et al.; "Modular Norm Models: A Lightweight Approach for Modeling and Reasoning about Legal Compliance", IEE Computer Society, 2017, pp. 657-662.

Hashmi M.; "A Methodology for Extracting Legal Norms from Regulatory Documents", IEEE Computer Society, 2015, pp. 41-50.

Kiyavitskaya, N. et al.; "Automating the Extraction of Rights and Obligations for Regulatory Compliance", Conceptual Modeling, 2008, pp. 154-168.

Islam, M. et al. "RuleRS: a rule-based architecture for decision support systems", Spring Science+Business Media B. V., 2018, pp. 315-344.

(56) References Cited

OTHER PUBLICATIONS

Yang X. et al., "Learning to Extract Semantic Structure from Documents Using Multimodal Fully Convolutional Neural Networks," The Pennsylvania State University, pp. 1-16, 2017.

Katti A. et al.; "Chargrid: Towards Understanding 2D Documents," arXiv: Computation and Language, 2018, pp. 1-11.

Soviany P. et al., "Optimizing the Trade-off between Single-Stage and Two-Stage Object Detectors using Image Difficulty Prediction," arXiv: Computer Vision and Pattern Recognition, pp. 2-6, 2018.

Tsai H. et al., "Small and Practical BERT Models for Sequence Labeling," pp. 9-11, 2019.

Zhong, Haoxi, et al; "How does NLP benefit legal system: A summary of legal artificial intelligence." arXiv preprint arXiv:2004.12158v5, 2020.

Bach, Ngo Xuan, et al.; "Reference extraction from Vietnamese legal documents", Proceedings of the Tenth International Symposium on Information and Communication Technology, 2019. pp. 486-493.

Chalkidis, Ilias; Ion Androutsopoulos and Achilleas Michos; "Extracting contract elements", Proceedings of the 16th edition of the International Conference on Artificial Intelligence and Law, 2017.

Chalkidis, Ilias; Ion Androutsopoulos and Achilleas Michos; "Obligation and prohibition extraction using hierarchical Rnns", arXiv preprint arXiv:1805.03871v1, 2018.

International Search Report and Written Opinion issued by the Canadian Intellectual Property Office in connection with International Patent Application No. PCT/CA2021/051130 dated Nov. 1, 2021, 10 pages.

International Search Report and Written Opinion issued by the Canadian Intellectual Property Office in connection with International Patent Application No. PCT/CA2021/051586 dated Jan. 25, 2022, 10 pages.

International Search Report and Written Opinion issued by the Canadian Intellectual Property Office in connection with International Patent Application No. PCT/CA2021/051585 dated Feb. 16, 2022, 7 pages.

Non-Final Office Action issued by the U.S. Patent and Trademark Office dated Jul. 11, 2022 in connection with U.S. Appl. No. 16/562,589, 39 pages.

Yin, Pengcheng et al; "TaBERT: Pretraining for Joint Understanding of Textual and Tabular Data", arXiv: 2005.08314v1 [cs.CL] May 17, 2020.

Deng, Xiang et al.; "TURL: Table Understanding through Representation Learning", arXiv:2006.14806v2 [cs.IR] Dec. 3, 2020.

Du, Lun et al.; "TabularNet: A Neural Network Architecture for Understanding Semantic Structures of Tabular Data", arXiv:2106.03096v2 [cs.LG] Jun. 16, 2021.

Herzig, Jonathan et al.; "TAPAS: Weakly Supervised Table Parsing via Pre-training", arXiv:2004.02349v2 [cs.IR] Apr. 21, 2020.

Yang, Jingfeng et al.; "TableFormer: Robust Transformer Modeling for Table-Text Encoding", arXiv:2203.00274v1 [cs.CL] Mar. 1, 2022.

Herzig, Jonathan et al.; "Open Domain Question Answering over Tables via Dense Retrieval", arXiv:2103.12011v2 [cs.CL] Jun. 9, 2021.

Majumder, Bodhisattwa Prasad et al.; "Representation Learning for Information Extraction from Form-like Documents", Proceedings of the 58th Annual Meeting of the Association for Computational Linguistics, pp. 6495-6504, Jul. 5-10, 2020.

Eisenschlos, Julian Martin et al.; "Understanding tables with intermediate pre-training", arXiv:2010.00571v2 [cs.CL] Oct. 5, 2020.

Erickson, Nick et al.; "AutoGluon-Tabular: Robust and Accurate AutoML for Structured Data", arXiv:2003.06505v1 [stat.ML] Mar. 13, 2020.

Logan IV, Robert L. et al.; "Multimodal Attribute Extraction", arXiv:1711.11118v1 [cs.CL] Nov. 29, 2017.

Rebuffel, Clément et al., "A Hierarchical Model for Data-to-Text Generation", arXiv:1912.10011v1 [cs.CL] Dec. 20, 2019.

Ma, Shuming et al.; "Key Fact as Pivot: A Two-Stage Model for Low Resource Table-to-Text Generation", arXiv:1908.03067v1 [cs.CL] Aug. 8, 2019.

Zhang, Ziqi; "Towards Efficient and Effective Semantic Table Interpretation", P. Mika et al. (Eds.) ISWC 2014, Part I, LNCS 8796, pp. 487-505, 2014, Springer International Publishing Switzerland.

Bhagavatula, Chandra Sekhar et al.; "TabEL: Entity Linking in Web Tables", Northwestern University Evanston IL 60201, USA.

Zhang, Shuo et al.; "Web Table Extraction, Retrieval and Augmentation: A Survey", arXiv:2002.00207v2 [cs.IR] Feb. 5, 2020.

Ritze, Dominique et al.; Matching HTML Tables to Dbpedia; Wims 2015 Limassol, Cyprus.

Efthymiou, Vasilis et al; "Matching Web Tables with Knowledge Base Entities: From Entity Lookups to Entity Embeddings", pp. 1-16.

Jiménez-Ruiz, Ernesto et al.; "SemTab 2019: Resources to Benchmark Tabular Data to Knowledge Graph Matching Systems", A Harth et al. (Eds.): ESWC 2020, LNCS 12123, pp. 514-530, 2020, Springer Nature Switzerland AG.

Zhang, Ziqi; "Effective and Efficient Semantic Table Interpretation using TableMiner", Semantic Web tbd (2016) pp. 1-39, IOS Press.

Chen, Shuang et al.; "LinkingPark: An Integrated Approach for Semantic Table Interpretation", CEUR-WS.org/Vol-2775/paper7, pp. 1-10.

Shigarov A. et al.; "TabbyXL: Software platform for rule-based spreadsheet data extraction and transformation", Elsevier, Software X 10 (2019) 100270, pp. 1-6.

Shigarov A. et al.; "Rule-based spreadsheet data transformation from arbitrary to relational tables", Elsevier, Informational Systems 71 (2017) pp. 123-136.

Xu, Yiheng et al.; "LayoutLM: Pre-training of Text and Layout for Document Image Understanding", arXiv:1912.13318v5 [cs.CL] Jun. 16, 2020.

Dorodnykh, Nikita O. et al.; "Towards a Unviersal Approach for Semantic Interpretation of Spreadsheets Data", IDEAS 2020, Aug. 12-14, 2020, Seoul, Republic of Korea.

\* cited by examiner

BARCT EMISSIONS LIMITS - BIOMASS FUEL FIRING

303.1 NO$_x$ Emissions: Except as provided in Section 113.1, the NO$_x$ emissions from any unit shall not exceed 70 parts per million by volume on a dry basis, as determined pursuant to Section 501, corrected to twelve percent carbon dioxide (70 ppmvd @ 12% CO$_2$), when firing on biomass fuels.

303.2 CO Emissions: Except as provided in Section 113.1, the CO emissions from any unit shall not exceed 400 parts per million by volume on a dry basis, as determined pursuant to Section 501, corrected to twelve percent carbon dioxide (400 ppmvd @ 12% CO$_2$), when firing on biomass fuels.

| Emission Point ID | Control Device ID | Emission Source Name and ID | Pollutant | lb/hr | lb/year |
|---|---|---|---|---|---|
| | | Reactor T-1S | | | |
| | | Reactor Distillate Receiver T-2S | | | |
| T-1E | T-1C | Separator T-3S | Tetrahydrofuran | 1.25 | 1700 |
| | | Wiped Film Evaporator T-5S | | | |
| | | Waste Acid Water Tank T-6S | | | |
| T-5E | None | THF Drum Filling Station T-6S | Tetrahydrofuran | 2.5 | 800 |

EMISSION LIMIT - EMERGENCY STANDBY NONGASEOUS FUEL FIRING

304.1 NO$_x$ Emissions: The NO$_x$ emissions from any unit which normally burns gaseous fuel but burns nongaseous fuel only during emergency interruption of gaseous fuel supply by the serving utility shall not exceed 150 parts per million by volume on a dry basis as determined pursuant to Section 501, corrected to three percent oxygen (150 ppmvd @ 3% O$_2$), when firing on nongaseous fuel. Operation of the unit under this Section shall not exceed 168 hours per calendar year, excluding equipment and emission testing time, not exceeding 48 hours per calendar year.

FIG. 3A

A. DISCHARGE LIMITATIONS AND MONITORING REQUIREMENTS

During the period beginning on the effective date of this permit and lasting through the expiration date of this permit, the permittee is authorized to discharge from the following point source(s) outfall(s), described more fully in the permittee's application:

DSN001: Effluent limitations and monitoring requirements for filter backwash water, sedimentation basin washdown, and decant water from water treatment plants.

Such discharge shall be limited and monitored by the permittee as specified below:

| EFFLUENT CHARACTERISTIC | UNITS | DISCHARGE LIMITATIONS | | | MONITORING REQUIREMENTS | |
|---|---|---|---|---|---|---|
| | | Daily Minimum | Daily Maximum | Monthly Average | Measurement Frequency | Sample Type |
| Flow | MGD | - | Monitor | Monitor | 1/Day | Instantaneous |
| pH | s.u. | 6.0 s.u. | 8.5 s.u. | - | 1/Month | Grab |
| Total Suspended Solids | | - | 45.0 mg/l | 30.0 mg/l | 1/Month | Composite |
| Total Residual Chlorine | mg/l | - | 0.0197 | 0.0117 | 1/Month | Grab |
| | | - | 0.013 mg/l | 0.0075 mg/l | | |
| Aluminum, Total Recoverable | | - | Monitor | Monitor | 1/Month | Composite |
| Iron, Total Recoverable | | - | 1.0 mg/l | - | 1/Month | Composite |
| Phosphorus, Total as P | mg/l | - | Monitor | - | 1/Month | Composite |

1/ Samples collected to comply with the monitoring requirements specified above shall be collected at the following location: At the nearest accessible location just prior to discharge and after final treatment.

2/ For discharges to freshwater, the daily maximum and the monthly average limits for chlorine are 0.019 mg/l and 0.011 mg/l. For discharges to saltwater, the daily maximum and the monthly average limits for chlorine are 0.013 mg/l and 0.0075 mg/l.

3/ If the discharge is greater than 2,500 feet from a water of the state, monitoring of chlorine may not be required if the conditions of the "Chlorine Monitoring Options" of the "Notice of Intent" are met. However, the facility must code the total residual chlorine parameter on the electronic Discharge Monitoring Report (E-DMR) as *9 (monitoring is conditional not required this period).

FIG. 3B

BARCT EMISSIONS LIMITS - NONGASEOUS FUEL FIRING: Except as provided in Section 113, the NO$_x$ and CO emissions from any unit shall not exceed the limits specified in the table below. The NOx and CO emission limits shall be measured as parts per million by volume on a dry basis, as determined pursuant to Section 501, and corrected to three percent oxygen, when firing on nongaseous fuels.

| Item | Permit Section | Due Date | | |
|---|---|---|---|---|
| Discharge Monitoring Reports (DMR) | III.B. | DMRs are due monthly and must be postmarked on or before the 20th of the month following the monitoring month. | III.B.4. | The DMR deadline is extendible by 20 days upon payment of extension fee. |
| Chemical Additives Inventory | I.B.10. | The Permittee must submit an inventory of chemical additives used and documentation of each additive's concentration determinations and limitation compliance with the December DMR once authorized discharges have commenced. | | |
| Best Management Practices (BMP) Plan | II.A. | The Permittee must provide EPA with written notification that the Plan has been developed, or updated, and implemented at least 180 days prior to commencing any authorized discharges. The Plan must be kept on site and made available to EPA upon request. | | |
| Annual BMP Submission | II.A.3.k. | The Permittee must provide EPA with an annual statement that the Plan has been reviewed and fulfills the requirements set forth in this permit. The statement shall be certified by the dated signatures of each BMP Committee member. This statement must be submitted to EPA with the December DMR once authorized discharges have commenced. | | |
| Quality Assurance Plan (QAP) | II.B. | The Permittee must provide EPA with written notification that the Plan has been developed, or updated, and implemented at least 180 days prior to commencing any authorized discharges. The Plan must be kept on site and made available to EPA upon request. | | |
| Twenty-Four Hour Notice of Noncompliance Reporting | III.G.1. and III.H. | The Permittee must report certain occurrences of noncompliance by telephone within 24 hours from the time the Permittee becomes aware of the circumstances. | | |
| NPDES Application Renewal | V.B | The application must be submitted at least 180 days before the expiration date of the permit. | V.B.1 | The application deadline is extendible for 180 days upon payment of extension fee. |

LOW FUEL USAGE: Any unit exempted pursuant to Section 113 shall meet one of the following conditions:

FIG. 4

A. DISCHARGE LIMITATIONS AND MONITORING REQUIREMENTS

During the period beginning on the effective date of this permit and lasting through the expiration date of this permit, the permittee is authorized to discharge from the following point source(s) outfall(s), described more fully in the permittee's application:

| CA | CB | CC | CD | CE | CF | CG | CH | CI | CJ | CK | CL | CM | CN | CO | CP |
|---|---|---|---|---|---|---|---|---|---|---|---|---|---|---|---|
| Outfall # | 001 | Description of Wastewater: Domestic residential | | | | | | | | | | | | | |
| | | Type of Treatment: Septic tank and sandfilter | | | | | | | | | | | | | |
| Effluent Parameter | Units | Averaging Period | Existing Discharge Data | | | TBELs | | Water Quality Data & WQBELs | | | | | | | Basis for Permit Requirement |
| | | | Permit Limit | Existing Effluent Quality | # of Data Points Detects / Non-Detects | Limit | Basis | Ambient Bkgd. Conc. | Projected Instream Conc. | WQ Std. or GV | WQ Type | Calc. WQBEL | Basis for WQBEL | | |
| | | | | | | | | | | | | | | ML | |
| Flow Rate | GPD | 30 Day Avg | 12,650 | 5,442 | 64/0 | 12,650 | Consistent with TOGS 1.3.3, a monthly average flow limitation equal to the average daily design capacity of the treatment plant is specified. | | | | | | | | |
| pH | SU | Minimum | 6.0 | 6.18 | 64/0 | 6.0 | TOGS 1.3.3 | | | 6.5 – 8.5 (703.3) | Range | | | | TBEL |
| | | Maximum | 9.0 | 6.93 | 64/0 | 9.0 | | | | | | | | 703.2 | |
| | | | Given the available dilution and existing effluent limitation equal to the TBEL and consistent with TOGS 1.3.3 is reasonably protective of the WQS. | | | | | | | | | | | | |
| Temperature | °C | Daily Max | monitor | 12.1 | 1/0 | monitor | | | | 15.2 | | | | | TBEL |
| | | | Due to high dilution and existing effluent quality (EEW) being less than 70°F, the thermal effluent limit is not suggested. | | | | | | | | | | | | |

1/ Samples collected to comply with the monitoring requirements specified above shall be collected at the following location: At the nearest accessible location just prior to discharge and after final treatment.

2/ For discharges to freshwater, the daily maximum and the monthly average limits for chlorine are 0.019 mg/l and 0.011 mg/l. For discharges to saltwater, the daily maximum and the monthly average limits for chlorine are 0.013 mg/l and 0.0075 mg/l.

FIG. 5

| parameter | unit_of_measure | value | equipment_id |
|---|---|---|---|
| Tetrahydrofuran | lb/hr | 1.25 | T-1E |
| Tetrahydrofuran | lb/hr | 1.25 | T-1C |
| Tetrahydrofuran | lb/hr | 1.25 | Separator T-3S |
| Tetrahydrofuran | lb/year | 1700 | T-1E |
| Tetrahydrofuran | lb/year | 1700 | T-1C |
| Tetrahydrofuran | lb/year | 1700 | Separator T-3S |
| Tetrahydrofuran | lb/hr | 2.5 | T-5E |
| Tetrahydrofuran | lb/hr | 2.5 | Station Filling THF Drum T-6S |
| Tetrahydrofuran | lb/year | 800 | T-5E |
| Tetrahydrofuran | lb/year | 800 | Station Filling THF Drum T-6S |

FIG. 9A

| value | parameter | unit_of_measure | sampling_freq | sample_type | type_of_measure |
|---|---|---|---|---|---|
| Monitor | Flow | MGD | 1/Day | Instantaneous | Daily Maximum |
| Monitor | Flow | MGD | 1/Day | Instantaneous | Monthly Average |
| 6.0 | pH | s.u. | 1/Month | Grab | Daily Minimum |
| 8.5 | pH | s.u. | 1/Month | Grab | Daily Maximum |
| 45.0 | pH Total Suspended Solids | mg/l | 1/Month | Composite | Daily Maximum |
| 30.0 | pH Total Suspended Solids | mg/l | 1/Month | Composite | Monthly Average |
| 0.019 / 0.013 | Total Residual Chlorine | mg/l | 1/Month | Grab | Daily Maximum |
| 0.011 / 0.0075 | Total Residual Chlorine | mg/l | 1/Month | Grab | Monthly Average |
| Monitor | Aluminum, Total Recoverable | mg/l | 1/Month | Composite | Daily Maximum |
| Monitor | Aluminum, Total Recoverable | mg/l | 1/Month | Composite | Monthly Average |
| 1.0 | Iron, Total Recoverable | mg/l | 1/Month | Composite | Daily Maximum |
| Monitor | Phosphorus, Total as P | mg/l | 1/Month | Composite | Daily Maximum |

FIG. 9B 426                                                                      420

| value | Parameter | Unit of Measurement | Type of Measurement | Protocol ID |
|---|---|---|---|---|
| 9 | pH | SU | Minimum Permit Limit | — |
| 6 | pH | SU | Limit | TOGS 1.3.3 |
| 6.79 | pH | SU | Ambient Bkgd Conc. | — |
| 15.2 | Temperature | °C | Daily Max | TOGS 1.3.3 |
| ... | | | | |

424
422

441
442
440

General Notes:

Existing discharge data from 2014 to 5/6/2019 was obtained from the application provided by the permittee. Ambient background data was collected as part of the application including a hardness of 29.3 mg/L, temperature of 12.1 °C, and mH of 5.7. If seasonal limits apply, Summer is defined as June 1st through October 31st and Winter is defined as November 1st through May 31st.

Narrative (Non-Trout):

The water temperature at the surface of a stream shall not be raised to more than 90F at any point and ... shall not be raised or lowered to more than 5F over the temperature that existed before the addition (704.2)

FIG. 11

METHOD AND SYSTEM FOR EXTRACTING DATA FROM TABLES WITHIN REGULATORY CONTENT

BACKGROUND

1. Field

This disclosure relates generally to extracting data from a table comprising a plurality of cells, and more particularly to extracting data in a structured machine-readable format from image data of the table, the image data representing both a physical layout of the table and words and characters in the table.

2. Description of Related Art

Governments, private corporations and standards bodies generate documents setting out requirements and/or conditions that should be followed for compliance with applicable rules and regulations and to fall within applicable standards and policies. For example, governments implement regulations, permits, plans, court ordered decrees, and bylaws. Corporations implement external or internal policies and standard operating procedures. Standards bodies implement international standards. These documents may be broadly referred to as "regulatory content".

Documents setting out regulatory content often include tables outlining specific requirements. However, regulatory content may vary in size, from one page to several hundred pages, and it can be difficult to identify the tables including relevant requirements. Additionally, the format and the layout of tables may vary widely within a particular regulatory content document and across regulatory content documents. Finally, although tables often present information in a manner that is useful for human comprehension, it can be difficult for a computer to parse and extract relevant data from tables, as the format and the layout of tables vary widely as noted above and are important to understanding the data in tables. There remains a need for methods and systems that reduce the burden for enterprises in identifying requirements contained in tables which are relevant to their operations and a general need for methods and systems to extract data in a machine-readable format from data and requirements presented in a table.

SUMMARY

In one embodiment, there is provided a computer-implemented method for extracting data from a table comprising a plurality of cells. The method involves: receiving image data representing a physical layout of the table and words or characters in the table; generating a plurality of tokens, each token of the plurality of tokens representing a semantic unit of the words or characters; and generating at least one language embedding and at least one position embedding associated with each token of the plurality of tokens. The at least one language embedding comprises a semantic vector representation of the each token and the at least one position embedding comprises a position vector representation of a physical position of the each token in the physical layout of the table. The method further involves: associating at least one token of the plurality of tokens with a cell of the plurality of cells; receiving the plurality of tokens at an input of a cell classifier trained to generate a cell classification for each cell of the plurality of cells based on the language embeddings and the position embeddings of the at least one token associated with the each cell; and determining a relationship exists between at least two cells of the plurality of cells based at least in part on the cell classifications and the position embeddings of the plurality of tokens.

In another embodiment, there is provided a system for extracting data from a table comprising a plurality of cells based on image data representing a physical layout of the table and words or characters in the table. The system comprises a table processor configured to: generate a plurality of tokens representing the words or characters in the table; generate at least one language embedding and at least one position embedding associated with each token of the plurality of tokens, wherein the at least one language embedding comprises a semantic vector representation of the each token and the at least one position embedding comprises a position vector representation of a physical position of the each token in the physical layout of the table; and associate at least one token of the plurality of tokens with a cell of the plurality of cells. The system further comprises a cell classifier configured to receive the plurality of tokens and trained to generate a cell classification for each cell of the plurality of cells based on the language embeddings and the position embeddings of the at least one token associated with the each cell. The system further comprises a cell relationship identifier configured to determine a relationship exists between at least two cells of the plurality cells based at least in part on the cell classifications and the position embeddings of the plurality of tokens.

Other aspects and features of the present disclosure will become apparent to those ordinarily skilled in the art upon review of the following description of specific embodiments of the disclosure in conjunction with the accompanying figures.

BRIEF DESCRIPTION OF THE DRAWINGS

In drawings which illustrate embodiments,

FIGS. 3A and 3B are different "value" tables identified using the table classifier of FIG. 2 according to one embodiment;

FIG. 4 is a "requirement" table identified using the table classifier of FIG. 2 according to one embodiment;

FIG. 5 is a hybrid "value" and "requirement" table identified using the table classifier of FIG. 2 according to one embodiment;

FIGS. 9A and 9B are outputs retrieved from the "value" tables of FIGS. 3A and 3B respectively generated using the cell relationship identifier of FIG. 8 according to one embodiment;

FIG. 11 is an output of a hybrid "value" and "requirement" table of FIG. 5 generated using the cell relationship identifier of FIG. 8 according to one embodiment.

DETAILED DESCRIPTION

Figure 1:
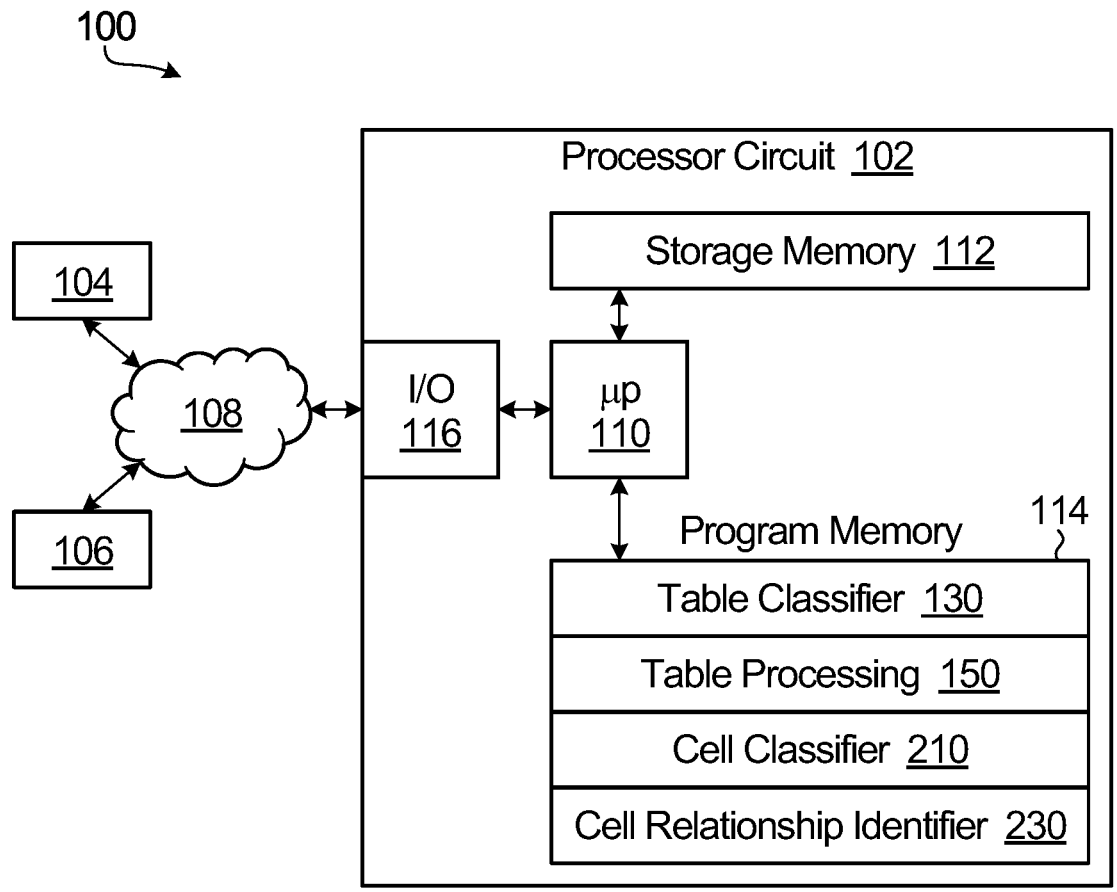
FIG. 1 is a schematic representation of a system for extracting data from tables in regulatory content according to one embodiment.

Referring to FIG. 1, a system for extracting data from tables in regulatory content based on an image of a physical page of the regulatory content according to one embodiment is shown generally at 100. In the embodiment shown, the system 100 includes a processor circuit shown generally at 102 in communication with an image capture system 104.

The image capture system 104 is configured to capture images of physical pages of the regulatory content, the images representing a physical layout of content on the physical page of the regulatory content. The image capture system 104 may comprise a camera or scanner for example. The image capture system 104 transmits the captured image as image data to the processor circuit 102 over a network 108. Certain physical pages of the regulatory content may include at least one table, or a portion of a table, having one or more columns and one or more rows forming a plurality of cells. Each cell of a plurality of cells may be an intersection of a row of the table with a column of the table, such that certain cells of the plurality of cells are a part of a same row or are a part of a same column as other cells. Certain tables may include cells which are merged with at least one adjacent cell in the same row or with at least one adjacent cell in the same column, and merged cells may be a part of, and correspond to, more than one row of the table or more than one column of the table. Data associated with the table include at least (a) a format and physical layout of the plurality of cells in the table and (b) words and characters in the table, both of which may be important to, and has significance for, understanding meaning and requirements of the regulatory content presented in the table. In the captured image data, the format and physical layout of the plurality of cells in the table and the words and characters in the table are represented by pixels rather than digital text or code, and may be in an image data format such as joint photographic experts group (jpeg), portable network graphics (png), graphics interchange format (gif), tagged image file format (tiff) and image-based portable document format (pdf) formats for example.

In certain embodiments, the system 100 may not include the image capture system 104 and the processor circuit 102 may instead receive the image data of the physical pages of the regulatory content from another source, such as from a server 106 over the network 108 for example. In yet other embodiments, the regulatory content may be received as digital data, where the format and physical layout of the plurality of cells in the tables and the words and characters in the tables are encoded in digital text or code, and may be in a digital data format such as comma separated values (csv), cascading style sheets (css), extensible markup language (xml) and digital portable document format (pdf) formats for example. Whether in the image data format or the digital data format, as described above, both (a) the format and physical layout of the plurality of cells in the table and (b) the words and characters in the table are important to understanding the meaning and requirements of the regulatory content presented in the table.

Still referring to FIG. 1, in the embodiment shown, the processor circuit 102 includes at least one processor 110, a program memory 112, a storage memory 114, and an input/output (I/O) interface 116 all in communication with the at least one processor 110. Other embodiments of the processor circuit 102 may include fewer, additional or alternative components.

The I/O interface 116 comprises an interface for communicating information, including the data associated with tables (whether in the image data format or the digital data format), over the network 108 with external components such as the image capture system 104 or the server 106 for example. Although only a single image capture system 104 and a single server 106 are shown in FIG. 1, the I/O interface 116 may allow the processor 110 to communicate with more than one image capture system 104 or more than one server 106. In some embodiments, the processor 110 may communicate with the image capture system 104 or the server 106 without the network 108. The I/O interface 116 may include any communication interface which enables the processor 102 to communicate with external components, including specialized or standard I/O interface technologies such as channel, port-mapped, asynchronous for example.

The program and storage memories 112 and 114 may each be implemented as one or a combination of a random-access memory ("RAM"), a hard disk drive ("HDD"), and any other computer-readable and/or -writable memory. In other embodiments, the processor circuit 102 may be partly or fully implemented using different hardware logic, which may include discrete logic circuits and/or an application specific integrated circuit ("ASIC"), for example. In some embodiments, the processor 110 may communicate with the storage or program memories 114 and 112 via the network 108 or another network. For example, the processor 110, the program memory 112 and the storage memory 114 may be located on physical computer servers which are remote from each other and may communicate over the network 108 or another network, forming a cloud-based processor circuit. The storage memory 114 may store information received or generated by the processor 110 (such as the image data or the digital data of the physical pages of the regulatory content for example) and may be an information or data store. The program memory 112 may store various blocks of code, including codes for directing the processor 110 to execute various functions, such as table classification functions, table processing functions as described below, cell classification functions, and relationship identification functions. The program memory 112 may also store database management system (DBMS) codes for managing databases in the storage memory 114. In other embodiments, the program memory 112 may store additional or alternative blocks of code for directing the processor 110 to execute additional or alternative functions.

In operation, the processor circuit 102 is generally configured to receive the physical pages of the regulatory content (whether in the image data format or the digital data format), such as from the image capture system 104 or from the server 106 over the network 108, and process the physical pages of the regulatory content to extract and present the data associated with any table in a structured machine-readable format which maintains both the format and physical layout of the plurality of cells in the table and the words and characters in the table. The processor circuit 102 may initially store the image data or digital data representing the physical pages of the regulatory content in the storage memory 114 before processing at least one table within the regulatory content to extract and present the data associated with the table.

Figure 2:
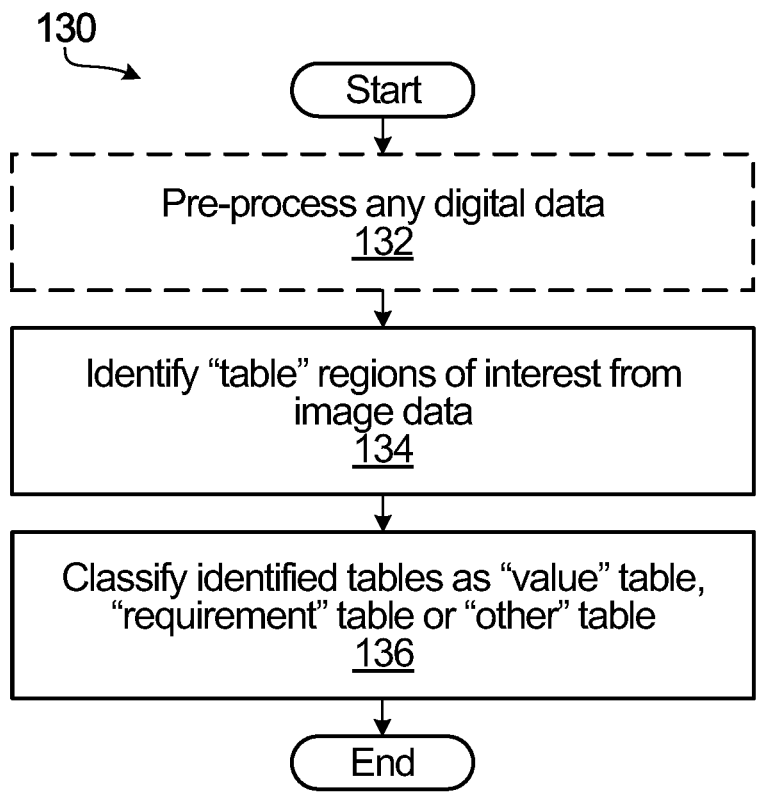
FIG. 2 is a schematic representation of codes of a table classifier stored in a program memory of the system of FIG. 1 according to one embodiment.

The processor circuit 102 may begin processing the image data or the digital data representing the physical pages of the regulatory content by initiating a table classifier 130 stored in the program memory 112, an embodiment of which is shown in FIG. 2. The table classifier 130 generally includes codes for identifying and classifying tables in the received regulatory content.

When the regulatory content is received in the digital data format and includes digital and machine-readable data representing the format and physical layout of the plurality of cells in the tables of the received regulatory content, the table classifier 130 may include a pre-processing block 132, which includes codes directing the processor 110 to convert the digital data into converted image data where the format and physical layout of the plurality of cells are represented by a pixel-based image. The converted image data representing each physical page of the regulatory content may be stored in the storage memory 114 and may specifically be stored in association with the original digital data representing the same physical page of the regulatory content. When the regulatory content is in the image data format, the table classifier 130 may not begin at (or may not include) the pre-processing block 132.

The table classifier 130 then continues to block 134, which includes codes directing the processor 110 to identify potential tables from the image data or the converted image data of the physical pages of the regulatory content. For example, block 134 may direct the processor 110 to input the image data (or the converted image data) representing the physical pages of the regulatory content into an object classifier model configured to output a region label for different regions of interest in each image representing the physical pages of the regulatory content. The region labels include without limitation "citation", "text", "table", "list", and "header/footer" for example. This object classifier model may be trained and configured using methods described in U.S. patent Ser. No. 10/956,673, commonly assigned, the entire disclosure of which is herein incorporated by reference. Briefly, the object classifier model may be trained by inputting training image data representing regulatory content and including regions of interest which are ground labelled with region labels such as "citation", "text", "table", "list", "header/footer", etc. into an neural network to iteratively generate and optimize coefficients which enable the neural network to generate region labels for different regions of interest based on an input of the image data representing the physical pages of the regulatory content. The object classifier model may be trained on the server 106 and locally stored in the storage memory 114.

The table classifier 130 then continue to block 136, which includes codes directing the processor 110 to further classify regions of interest classified as "table" ("table" regions of interest) at block 134 as specific types of tables. For example, block 136 may direct the processor to input the image data (or the converted image data) of the "table" regions of interest into a table classifier model configured to output a table label representing a type of table. The table labels include without limitation "value", "requirement", and "other" for example. For example, "table" regions of interest may be classified as "value" when the table includes numerical values requirements within a single cell or text-based requirements for a user of the regulatory content to report a numerical value in a single cell, and "table" regions of interest may be classified as "requirement" when the table includes text-based requirements within a single cell, and "table" regions of interest may be classified as "other" when the table cannot be classified as either a "value" or a "requirement" table. In other embodiments, the table labels may include other labels, such as "supplementary", "appendix", etc. associated with tables having other requirements or information.

The table classifier model may be trained in a manner similar to the object classifier model described above at block 134. Briefly, the table classifier model may be trained by inputting training image data representing "table" regions of interest which are ground labelled with at least the table labels "value", "requirement", and "table" into a neural network to iteratively generate and optimize coefficients which enable the neural network to generate table labels for different "table" regions of interest based on an input of the image data representing the "table" regions of interest. The trained table classifier model may be trained on the server 106 and locally stored in the storage memory 114. In certain embodiments, the object classifier model used at block 134 may itself further be trained on the training image data of "table" regions of interest ground labelled with the table labels, such that the object classifier model is configured to output both the region labels and the table labels. However, utilizing cascading classifier models as described above—whereby the initial region labels are generated using the object classifier model and only a portion of the output of the object classifier model (specifically, the regions of interest classified as "table") is analysed to determine the subsequent table labels using the table classifier model—can reduce the computing resources required to arrive at a final table classification for the "table" region of interest. Embodiments of a "table" region of interest which may be classified as "value" by the table classifier model ("value" table) are generally shown at 280 in FIG. 3A and at 360 in FIG. 3B. One embodiment of a "table" region of interest which may be classified as "requirement" ("requirement" table) is generally shown at 310 in FIG. 4.

Additionally or alternatively, the table classifier model may be responsive to manually inputted thresholds for values within each cell of the "table" region of interest being classified. For example, the table classifier model may receive identification of tokens of a plurality of tokens associated with each cell (such as after block 170 of table processing codes 150 shown in FIG. 6 for example) and may include codes directing the processor 110 to classify the "table" region of interest as a "value" table when one or more cells of that table is associated with a token presenting a numerical value and as a "requirement" table when one or more cells of that table is associated with tokens representing a full sentence for example.

Additionally or alternatively, the table classifier model may also be responsive to cell classifications of the cells of the "table" region of interest (or the cell classifications of the tokens associated with the cells). Certain cell classifications may be exclusive to "value" tables, such as "value" cells or "parameter" cells for example, while other cell classifications may be exclusive to "requirement" tables, such as "citation" cells or "requirement" cells for example. The table classifier model may receive cell classifications (such as generated at block 216 of a cell classifier 210 shown in FIG. 7) and may include codes directing the processor 110 to classify the "table" region of interest as a "value" table when one or more cells of that table is classified as a "value" cell as described below, or as a "requirement" table when one or more cells of that table is classified as a "citation" cell as described below. In certain embodiments, the table classifier model may classify the "table" region of interest with a particular table label when more than a threshold number of cells within the table has a cell classification exclusive to that table label. In other embodiments, a cell classifier model of the cell classifier 210 may classify the "table" region of interest with a particular table label based on majority voting of the cells within the table, namely when more than a threshold percentage of cells within that table has a cell classification exclusive to that table label. Confirmation or generation of the table classification of a "table" region of interest using feedback of tokens associated with cells in that table and/or cell classification of cells (or sub-cells) in that table can improve the accuracy of the table classification performed by the processor 110. Additionally, confirmation or generation of the table classification using cell classifications may also improve the speed of the processor 110 at arriving at both a final table label for the "table" region of interest and cell labels for cells in that table, by allowing the processor 110 to perform table classification and cell classification substantially simultaneously.

In some embodiments, the table classifier model may classify different portions of one particular "table" region of interest with different table labels. For example, referring to FIG. 5, a "table" region of interest may be primarily classified as a "value" table 390 by the table classifier model, but include portions or subregions which are classified as "requirement" tables 391, such that the "table" region of interest comprises a hybrid "value" and "requirement" table. In some embodiments, the table classifier model may classify different portions of a "table" region of interest with different table labels based on the image data (or the converted image data) of that portion of the table, based on the tokens associated with cells (or sub-cells) in that portion of the table, and/or based on the cell classification of the cells (or the sub-cells) within that portion of the table as described above.

Figure 6:
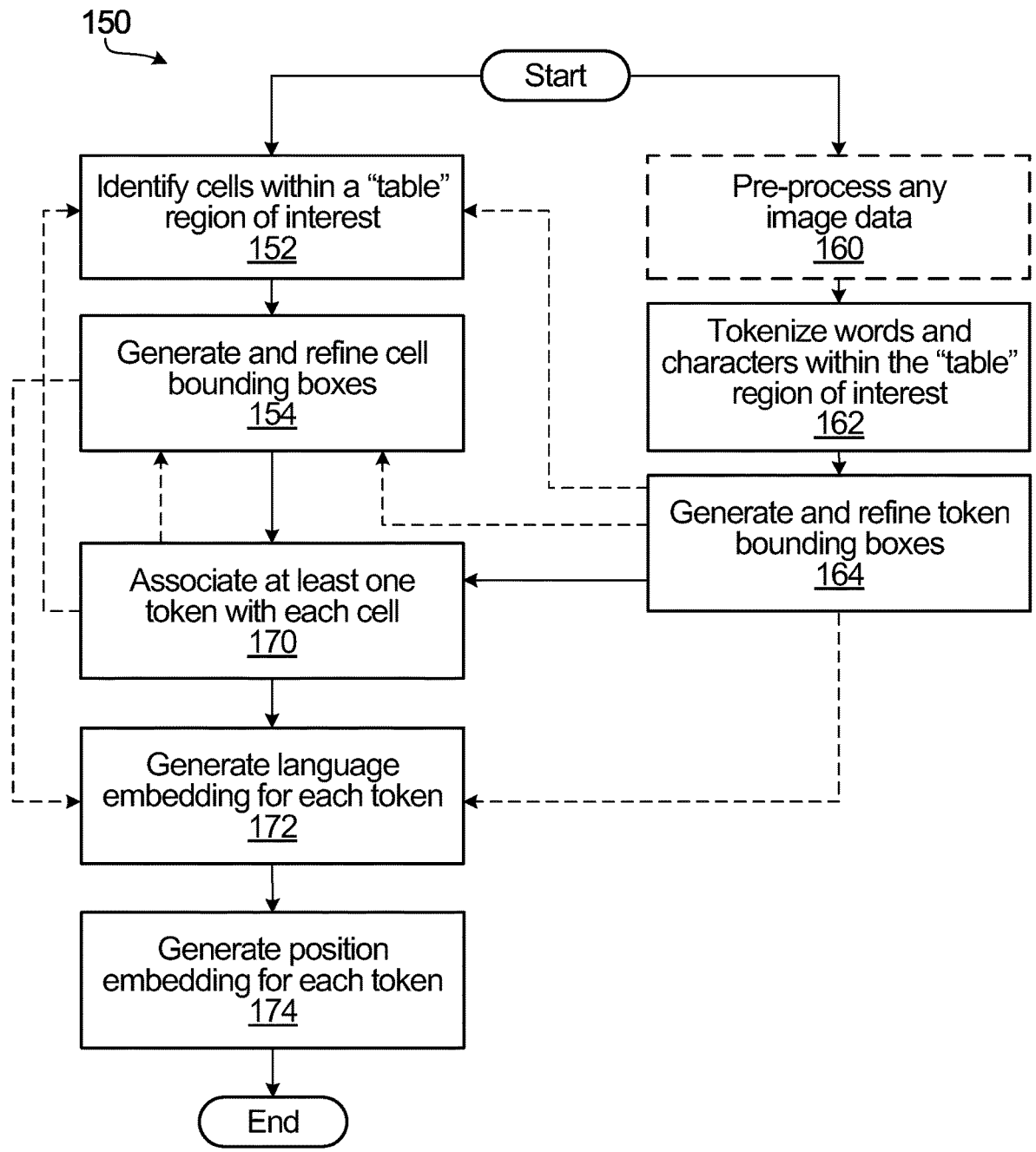
FIG. 6 is a schematic representation of table processing codes stored in the program memory of the system of FIG. 1 according to one embodiment.

After the potential tables are identified from the image data of the physical pages of the regulatory content by the table classifier 130, the processor circuit 102 may further process the image data (or the converted image data) of the "table" regions of interest by initiating the table processing codes 150 stored in the program memory 112, an embodiment of which is shown in FIG. 6. The table processing codes 150 generally include codes for identifying and generating bounding boxes for a plurality of cells in the table, identifying and generating bounding boxes for a plurality of tokens representing the words and characters in the table, associating the generated tokens with the identified cells, and embedding the generated tokens with language and position information.

Referring to FIG. 6, in the embodiment shown, the table processing codes 150 may begin at block 152, which includes codes directing the processor 110 to identify each cell of the plurality of cells (such as a plurality of cells 282 shown in FIG. 3A, a plurality of cells 362 shown in FIG. 3A, a plurality of cells 312 shown in FIG. 4 and a plurality of cells 392 shown in FIG. for example) within each "table" region of interest classified by the table classifier 130. For example, block 152 may direct the processor 110 to detect horizontal and vertical lines within the image data (or the converted image data) of the "table" region of interest. Additionally or alternatively, block 152 may direct the processor 110 to detect space delimiters above a threshold size between the words and characters in the "table" region of interest. Additionally, block 152 may be responsive to the inherent structure of a table, and may initially assume that a table has a set number of rows and a set number of columns.

The table processing codes 150 then continue to block 154, which includes codes directing the processor 110 to generate cell bounding boxes (such as cell bounding box 284 shown in FIG. 3A, cell bounding box 364 shown in FIG. 3B, cell bounding box 314 shown in FIG. 4 and cell bounding boxes 394 and 395 shown in FIG. 5 for example). Each "cell bounding box" is a positional vector which establishes a physical position of the corresponding cell within a physical layout of the "table" region of interest. For example, in the embodiment shown, each cell bounding box may include [x,y, width, height] representing, respectively, (a) the normalized x,y location of a top left point (such as top left point 286 shown in FIG. 3A and top left point 316 shown in FIG. 4 for example) of each cell bounding box relative to a normalized top edge (such as normalized top edge 288 shown in FIG. 3A and normalized top edge 318 shown in FIG. 4 for example) and a normalized left edge (such as normalized left edge 290 shown in FIG. 3A and normalized left edge 320 shown in FIG. 4 for example) of the image representing a physical page of the regulatory content; (b) a width of each cell bounding box (such as width 287 shown in FIG. 3A and width 317 shown in FIG. 4 for example) and (c) a height of each cell bounding box (such as height 289 shown in FIG. 3A and height 319 shown in FIG. 4 for example). In certain embodiments, identifying the plurality of cells at block 152 and generating the cell bounding boxes at block 154 may be perform with existing text extraction models, such as Amazon Textract™ or Google Tesseract™ OCR for example. As an example, Textract™ provides a function that outputs the cell bounding boxes as a ratio with respect to the image representing a physical page of the regulatory content, which can be converted into pixel references within the image data by multiplying the coordinates by a number of pixels representing the image (e.g. 1700× 2200 pixels). Outputting the cell bounding boxes as a ratio of the image representing the physical page can provide subsequent functions of the processor 110 (including the cell classifier 210 shown in FIG. 7 and the cell relationship identifier 230 shown in FIG. 8) with position information indicative of a size and position of the "table" region of interest and the plurality of cells in the table relative to the larger physical page.

Blocks 152 and 154 may also include codes directing the processor 110 to refine the identification of each cell and the generation of each cell bounding box based on the tokens associated with each cell. For example, blocks 152 and 154 may receive token bounding boxes of tokens (such as from block 164 of the table processing codes 150 for example) and may direct the processor 110 determine whether the token bounding boxes of certain tokens overlap cell bounding boxes of two or more cells and whether a single token is associated with more than one cell. In such situations, blocks 152 and 154 may direct the processor 110 to flag the overlapped cell bounding boxes for manual correction or may merge the overlapped cell bounding boxes into a larger cell bounding box. As a specific example, blocks 152 and 154 may include automatic cell merger codes directing the processor 110 to iterate through all identified cells and generated cell bounding boxes in a same or corresponding row of a particular table and merge adjacent cells in the same or corresponding row when a token bounding box associated with a single token overlaps both cell bounding boxes of the adjacent cells by 15% or more. The automatic cell merger codes may then direct the processor 110 to iterate through all identified cells and generated cell bounding boxes in a same or corresponding column of the table and merge adjacent cells in the same or corresponding column when a token bounding box associated with a single token overlaps both cell bounding boxes of the identified adjacent cells by 15% or more.

When the regulatory content is received in the image data format and includes image data (pixel-based data for example) representing the words and characters within the "table" region of interest, the table processing codes 150 may also begin at an optional pre-processing block 160, which includes codes for initially converting the image data representing the "table" region of interest into a machine-readable digital data format (converted digital data format). For example, the pre-processing block 160 may include codes directing the processor 110 to input the image data into an optical character recognition model. The converted digital data format representing the "table" region of interest may be stored in the storage memory 114 and may specifically be stored in association with the image data representing the same "table" region of interest. In certain embodiments, converting the image data into a machine-readable digital data format may be performed using existing text extraction models, such as Amazon Textract™ or Google Tesseract™ OCR for example. However, when the regulatory content is in the digital data format, the table processing codes 150 may not include the pre-processing block 160.

The table processing codes 150 then continue to block 162, which includes codes directing the processor 110 to tokenize the words and characters in the digital data format (or the converted digital data format) within the "table" region of interest to generate a plurality of tokens (such as a plurality of tokens 292 shown in FIG. 3A, a plurality of tokens 372 shown in FIG. 3B, a plurality of tokens 322 shown in FIG. 4 and a plurality of tokens 402 shown in FIG. 5 for example). A "token" may be a semantic unit of words or of characters within the "table" region of interest and may be any sequence of characters grouped together as a unit useful for processing. The words and characters may be divided into the semantic units at a word level, sub-word level, and/or character level. For example, block 162 may direct the processor 110 to determine which single words correspond to the words and characters in the table and then determine whether the single words exist in a dictionary. If the single words exist in the dictionary, a single token may be generated to represent the entire word (for example, the word "example" may be represented by a single token "example"). Additionally or alternatively, block 162 may direct the processor 110 to determine whether each single word is formed of different sub-words and then determine whether the sub-words exist in the dictionary. If the sub-words do exist in the dictionary, multiple tokens may be generated to represent each sub-word (for example, the word "smarter" may be represented by a first token "smart" and a second token "#er"). If the single word or the sub-word does not exist in dictionary, multiple tokens may be generated to represent each character of the word or the sub-word (for example, the sequence "TRU" may be represented by a first token "t", a second token "r" and a final token "#u"). As more specific examples, referring to FIG. 3A, the phrase "Reactor T-1S" may be represented by a first token "reactor", a second token "T", a third token "-", a fourth token "1" and a fifth token "S". Similarly, the phrase "Reactor Distillate Receiver T-2S" may be represented by a first token "reactor", a second token "di", a third token "##sti", a fourth token "##lla", a fifth token "##te", a sixth token "receiver", a seventh token "T", an eighth token "-" and a ninth token "23". Referring to FIG. 3B, the phrase "Total Residual Chlorine" may be represented by a first token "total", a second token "residual", a third token "ch", a fourth token "##lor", and a fifth token "##ine". Similarly, the phrase "8.5 s.u." may be represented by a first token "8.5" and a second token "s.u." and the phrase "0.019/0.013 mg/l" may be represented by a first token "0.019", a second token "/", a third token "0.013", and a fourth token "mg/l". Referring to FIG. 4, the phrase "III.B" may be represented by a single token "III.B". Referring to FIG. 5, the phrase "General Notes" may be represented by a first token "general" and a second token "notes".

The table processing codes 150 then continue to block 164, which similar to block 154 described above, includes codes directing the processor 110 to generate token bounding boxes (such as token bounding box 294 shown in FIG. 3A, token bounding box 374 shown in FIG. 3B, token bounding box 324 shown in FIG. 4 and token bounding boxes 404 and 405 shown in FIG. 5). Each "token bounding box" is a positional vector which establishes a physical position of the corresponding token within the physical layout of the "table" region of interest. For example, in the embodiment shown and similar to the cell bounding boxes described above, each token bounding box may include [x,y, width, height] representing, respectively, (a) the normalized x,y location of a top left point (such as top left point 296 shown in FIG. 3A and top left point 326 shown in FIG. 4 for example) of each token bounding box relative to the normalized top edge (such as the normalized top edge 288 shown in FIG. 3A and the normalized top edge 318 shown in FIG. 4 for example) and the normalized left edge (such as the normalized left edge 290 shown in FIG. 3A and the normalized left edge 320 shown in FIG. 4 for example) of the image representing a physical page of the regulatory content; (b) a width of each token bounding box (such as width 297 shown in FIG. 3A and width 327 shown in FIG. 4 for example) and (c) a height of each token bounding box (such as height 299 shown in FIG. 3A and height 329 shown in FIG. 4 for example). Outputting the token bounding boxes as a ratio of the image representing the physical page can provide subsequent functions of the processor 110 (including the cell classifier 210 shown in FIG. 7 and the cell relationship identifier 230 shown in FIG. 8) with position information indicative of a size and position of the plurality of tokens relative to the larger physical page. In certain embodiments and as described above, block 164 may also transmit the generated token bounding boxes to blocks 152 and 154 to enable the processor 110 to double-check or refine the plurality of cells identified at block 152 and the cell bounding boxes generated at block 154. Blocks 162 and 164 may also transmit the generated tokens and token bounding boxes to the table classifier 130 to double-check or refine the table classification generated by the table classifier 130.

After the plurality of cells and their corresponding cell bounding boxes are generated at blocks 152 and 154 respectively and the plurality of tokens and their corresponding token bounding boxes are generated at blocks 162 and 164 respectively, the table processing codes 150 then continue to block 170, which includes codes directing the processor 110 to associate each cell of the plurality of cells with one or more tokens of the plurality of tokens. For example, block 170 may direct the processor 110 to associate a token with the cell when the token bounding box of that token overlaps with the cell bounding box of that cell. For example, referring to FIG. 3A, the token bounding box 294 of the first token "reactor" and the token bounding boxes of the second token "T", the third token "-", the fourth token "1" and the fifth token "S" may overlap the cell bounding box 284, and the first to fifth tokens "reactor", "T", "-", "1" and "S" may be associated with the corresponding cell. Similarly, referring to FIG. 3B, the first token bounding box 374 of the first token "total" and the token bounding boxes of the second token "residual", third token "ch", fourth token "##lor", and fifth token "##ine" may overlap the cell bounding box 364 and the first to fifth tokens "total", "residual", "ch", "##lor", and "##ine" may be associated with the corresponding cell. Similarly, referring to FIG. 4, the token bounding box 324 for the token "III.B" may overlap the cell bounding box 314, and the token "III.B" may be associated with the corresponding cell. Finally, referring to FIG. 5, the token bounding box 404 of the first token "general" and the token bounding box of the second token "notes" may overlap the cell bounding box 394 and the first and second tokens "general" and "notes" may be associated with the corresponding cell. Similarly, the token bounding box 405 of a first token "5,442" and a token bounding box of a second token "average" may overlap the cell bounding box 395 and the first and second tokens "5,442" and "average" may be associated with the corresponding cell.

Additionally or alternatively, to double check and refine the association between tokens and cells and to ensure that the tokens are in a correct order, block 170 may include codes directing the processor 110 to linearize and/or order all tokens associated with a particular cell. For example, the processor 110 may use a top left-most position (such as the top left point 296 shown in FIG. 3A and the top left point 326 shown in FIG. 4 for example) of token bounding boxes of each token associated with a particular cell to perform line detection and to order the tokens on each detected line based on the top left-most position of their respective token bounding boxes.

Additionally or alternatively, and as described above, block 170 may transmit the generated association between tokens and cells to blocks 152 and 154 to allow the processor 110 to double-check or refine the plurality of cells identified at block 152 and the cell bounding boxes generated at block 154 based on the tokens associated with the plurality of cells, and to determine whether a single token bounding box overlaps multiple cell bounding boxes for example. Where the cell bounding boxes generated at block 154 change as a result of the transmitted association between tokens and cells, the table processing codes 150 may direct the processor 110 to repeat block 170.

The table processing codes 150 then continue at block 172, which includes codes directing the processor 110 to generate a language embedding for each token of the plurality of tokens generated at block 162. In certain embodiments, the table processing codes 150 may continue from blocks 164 and 154 directly to block 172 without generating an association between the tokens and the cells at block 170. A "language embedding" may be a semantic vector representation of a meaning of the word, the sub-word or the character of each token. For example, the language embedding of a token may be [0.34567789, −0.67963753921, 1.45239783693, 0.002587369, . . . ]. In certain embodiments, block 172 may include codes for inputting the digital data (or the converted digital data) of each token into a language model. The language model may be a pre-existing language model such as such as Google Bidirectional Encoder Representations from Transformers (BERT) or OpenAI Generative Pretrained Transformer (GPT-3). The pre-trained language models are trained using large multilingual datasets to capture semantic and contextual meaning of words in text and may be implemented to generate the language embedding for text in any language that is inputted to the language model. The pre-trained language models may context sensitive, such that the semantic vector representation of the word, sub-word or character varies depending on the context of words and character in the table. For example, the semantic vector representation for the word "club" in "club sandwich" and "night club" may be different and may have different language embeddings.

The table processing codes 150 then continue to block 174, which includes codes directing the processor 110 to generate a position embedding for each token of the plurality of tokens generated at block 162. A "position embedding" may be a position vector representation of a physical position associated with each token within the physical layout of "table" region of interest. In some embodiments, block 174 may direct the processor 110 to use the cell bounding boxes (such as the cell bounding box 284 shown in FIG. 3A, the cell bounding box 364 shown in FIG. 3B, the cell bounding box 314 shown in FIG. 4 and the cell bounding boxes 394 and 395 shown in FIG. 5 for example) generated at block 154 of the cell which is then associated with the token at block 170 as the position embedding for each token. In other embodiments, block 174 may direct the processor 110 to utilize the token bounding boxes (such as the token bounding box 294 shown in FIG. 3A, the token bounding box 374 shown in FIG. 3B, the token bounding box 324 shown in FIG. 4 and the token bounding boxes 404 and 405 shown in FIG. 5) generated at block 164 as the position embedding for each token. In yet other embodiments, block 174 may direct the processor 110 to use both the cell and token bounding boxes as the position embedding for each token. Using the cell bounding boxes as the position embedding for the tokens may allow the cell classifier 210 (shown in FIG. 7) and cell relationship identifier 230 (shown in FIG. 8) to process position information which better represent a format or physical layout of the "table" region of interest. The table processing codes 150 then end.

Figure 7:
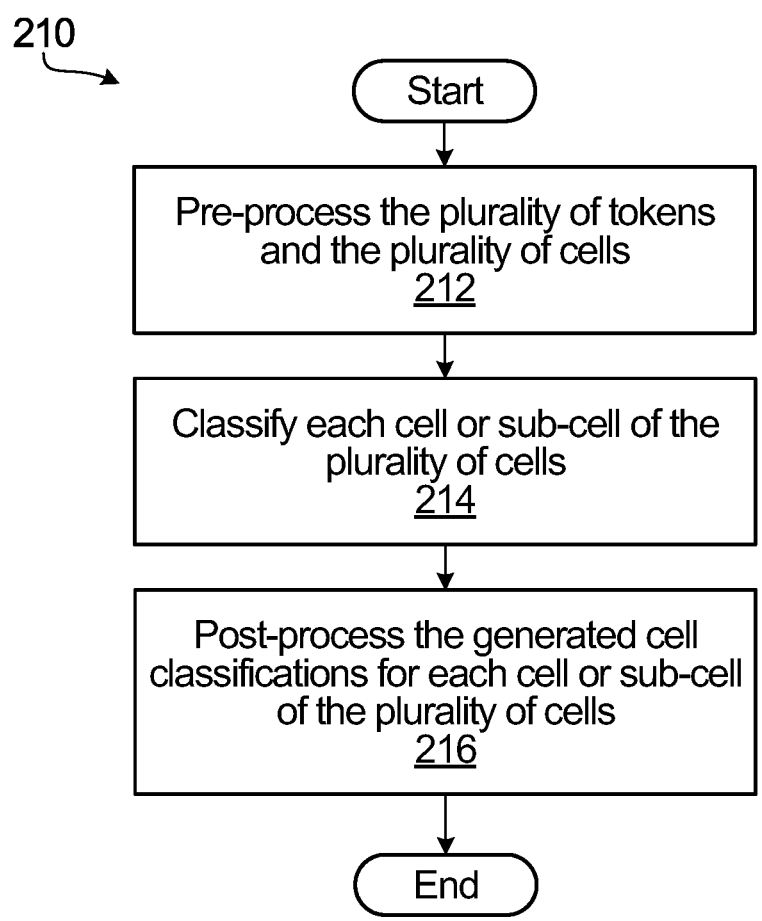
FIG. 7 is a schematic representation of codes of a cell classifier stored in the program memory of the system of FIG. 1 according to one embodiment.

After the plurality of tokens with associated language embeddings and position embeddings have been generated by the table processing codes 150 (such as after block 174 shown in FIG. 6), the processor circuit 102 may initiate the cell classifier 210 stored in the program memory 112, an embodiment of which is shown in FIG. 7. The cell classifier 210 generally includes code for generating a cell classification for each cell (or sub-cell) of the plurality of cells.

Referring to FIG. 7, the cell classifier 210 may begin at block 212, which includes codes directing the processor 110 to pre-process the plurality of tokens and the plurality of cells associated with each "table" region of interest. For example, block 212 may direct the processor 110 to determine whether a number of tokens within a single table is greater than or less than a maximum number of tokens. In some embodiments, the maximum number of tokens is 512; however, in other embodiments, the maximum number of tokens may be greater or fewer. Where the number of tokens within a single table is greater than the maximum number of tokens, block 212 may direct the processor 110 to separate the tokens into one or more subsets of tokens having the maximum number of tokens. Where the number of tokens with a single table is less than the maximum number of tokens, or where a subset of tokens is less than the maximum number tokens, block 212 may also direct the processor 110 to pad the tokens to the maximum number of tokens with pad tokens. Maintaining the set of analysed tokens at a constant maximum number of tokens may improve computational efficiency of the cell classifier model of the cell classifier 210 described below, such as by maintaining a tensor shape of a neural network associated with the cell classifier model as described below.

The cell classifier 210 then continue to block 214, which includes codes directing the processor 110 to generate the cell classification for each cell or each sub-cell based on inputs of one or more of (a) the token of the plurality of tokens associated with the cell or sub-cell, (b) the language embedding associated with the token (generated at block 172 of the table processing codes 150 shown in FIG. 6 for example) and (c) the position embedding associated with the token (generated at block 174 of the table processing codes 150 shown in FIG. 6 for example). For example, block 214 may direct the processor 110 to input the plurality of tokens with their associated language embeddings and position embeddings into the cell classifier model configured to output a cell label for each token of the plurality of tokens. The cell labels include without limitation, "time span", "parameter", "value", "equipment identifier", "background", "unit of measure", "type of measure", "sample type", "protocol identifier", "sampling frequency", "citations", "requirements", and "headers". For example, the cell label "value" may represent a numerical value or text-based requirements for a user of the regulatory content to report a numerical value, and may be associated with a token representing "1.25" or tokens representing "report", "provide" or "monitor" for example. The cell label "unit of measure" may represent a unit of measure for a value, and may be associated with tokens representing "lb/hour" or "s.u." or "mg/l" or "° C." for example. The cell label "parameter" may identify a substance/material related to a value being measured, and may be associated with tokens representing "pH", "temperature" or "tetrahydrofuran" for example. The cell label "equipment identifier" may identify an equipment used to measure a value of a substance/material, and may be associated with tokens representing "Reactor T-1S" for example. The cell label "sampling frequency" may represent how often a substance/material is sampled, and may be associated with tokens representing "hourly", "daily", "weekly", "monthly" or "annually" for example. The cell label "time span" may represent a time period when a substance/material is sampled, and may be associated with tokens representing "November-March", "September", etc. The cell label "sample type" may represent a method that is used to sample a substance/material, and may be associated with tokens representing "grab", "in-situ", "continuous", and "composition" for example. The cell label "type of measurement" may identify a process, method or calculation used for generating a value being measured, and may be associated with tokens representing "average monthly", "arithmetic mean", "daily maximum" or "30-day geometric mean" for example. The cell label "protocol identifier" may represent a regulation (or a part of a regulation), such as a regulated method, which affects a value being measured or other aspects of the table, and may be associated with tokens identifying such regulations, such as tokens representing "50050", "00400" or "TOGS 1.3.3" for example. The cell label "header" may represent headers of the table. The cell label "citations" may represent regulation identifiers or section headers which identify a portion of the regulatory content, and may be associated with tokens representing "III.B" or "section 29.1" for example. The cell label "requirements" may represent text-based requirements, and may be associated with tokens representing a sentence-based description of requirements, of a regulation, such as "DMRs are due monthly and must be postmarked on or before the 20$^{th}$ of the month following the monitoring month" for example. The cell label "background" may represent information which does not fit into any of the other labels, which allows the cell classifier model to provide a cell label to each cell of the plurality of cells or to each token associated with each cell.

The cell classifier model may be trained on training tokens associated with language embeddings and position embeddings which are ground labelled with at least the cell labels "time span", "parameter", "value", "equipment identifier", "background", "unit of measure", "type of measure", "sample type", "protocol identifier", "sampling frequency", "citations", "requirements", and "headers" for example into a neural network to iteratively generate and optimize coefficients which enable the neural network to generate cell labels for different tokens based on an input including the language embeddings and the position embeddings associated with each token. In some embodiments, the cell classifier model may originally comprise an existing layout model such as Microsoft LayoutLM, LayoutLM v2 and LayoutXLM which are trained on a data set comprising training tokens associated with language embeddings and position embeddings which are ground labelled with the cell labels as described above. The existing layout model may also be separated into sub-classifiers as described below. The cell classifier model may also be trained to generate the cell classifications based on alternative or additional inputs, such as the image data (or the converted image data) of the entire "table" region of interest (identified at block 134 of the table classifier 130 shown in FIG. 2 for example) or the table label of the table (generated at block 136 of the table classifier 130 shown in FIG. 2 for example). The cell classifier model may be trained on the server 106 and locally stored in the storage memory 114.

The cell classifier model may be responsive to whether the position embedding associated with the inputted plurality of tokens are the cell bounding boxes (such as the cell bounding box 284 shown in FIG. 3A, the cell bounding box 364 shown in FIG. 3B, the cell bounding box 314 shown in FIG. 4 and the cell bounding boxes 394 and 395 shown in FIG. 5 for example) or the token bounding boxes (such as the token bounding box 294 shown in FIG. 3A, the token bounding box 374 shown in FIG. 3B, the token bounding box 324 shown in FIG. 4 and the token bounding boxes 404 and 405 shown in FIG. 5). For example, the cell classifier model may include a cell bounding box sub-classifier and a token bounding box sub-classifier. The cell bounding box sub-classifier may be used to generate the cell classification when the inputted tokens are associated with position embeddings based on cell bounding boxes and is specifically trained on training tokens associated with position embeddings corresponding to the cell bounding boxes. The token bounding box sub-classifier may be used to generate the cell classification when the inputted tokens are associated with position embeddings based on token bounding boxes and is specifically trained on training tokens associated with position embeddings corresponding to the token bounding boxes. In some embodiments, both the cell and token bounding box sub-classifiers may be used to generate the cell classification when the plurality of tokens inputted into the cell classifier model are associated with position embeddings based on both token and cell bounding boxes. Additionally or alternatively, one of the cell and token bounding box sub-classifiers may be used to confirm or flag the cell classification generated by the other of the cell and token bounding box sub-classifiers.

In certain embodiments, language model of the table processing codes 150 and the cell classifier model of the cell classifier 210 may form a larger combined language and classifier model based on a combination of the pre-existing language models (such as Google BERT or OpenAI GPT-3) and the pre-existing layout models (such as Microsoft LayoutLM, LayoutLM v2 or LayoutXLM). In such embodiments, block 214 may include codes directing the processor 110 to generate both the language embedding for each token and the cell classification for each cell or each sub-cell based on inputs of (a) the token of the plurality of tokens associated with the cell or sub-cell, and (b) the position embedding associated with the token (generated at block 174 of the table processing codes 150 shown in FIG. 6 for example). For example, block 214 may direct the processor to input the plurality of tokens with their associated position embeddings into the combined language and classifier model. The combined language and classifier model has at least one initial layer trained to output the language embedding for each token based on the inputs of (a) the token and (b) the position embedding associated with the token, similar to the language model described above in association with block 172. The combined language and classifier model further includes at least one subsequent layer trained to output the cell classifications in response to the input of a combined embedding including both the language embedding generated by the at least one initial layer and the position embedding associated with the token.

The cell classifier model may also be responsive to the table classification of the "table" region of interest (generated at block 136 of the table classifier 130 shown in FIG. 2 for example). For example, the cell classifier model may include a value table cell sub-classifier configured to output cell labels relevant to "value" tables and a requirement table cell sub-classifier configured to output cell labels relevant to "requirement" tables. The value table cell sub-classifier may be configured to generate the cell classification when the inputted tokens originate from a "table" region of interest classified as a "value" table by the table classifier 130. The value table cell sub-classifier may be trained on training tokens derived from "value" tables and ground labelled with cell labels relevant to "value" tables, including without limitation "time span", "parameter", "value", "equipment identifier", "background", "unit of measure", "type of measure", "sample type", "protocol identifier", and "sampling frequency" for example. The requirement table cell sub-classifier may be used to generate the cell classification when the inputted tokens originate from a "table" region of interest classified as a "requirement" table by the table classifier 130. The requirement table cell sub-classifier may be trained on training tokens derived from "requirement" tables and ground labelled with cell labels relevant to "requirement" tables, including without limitation "citations", "requirement", "background", and "header" for example.

Block 214 may include codes directing the processor 110 generate a mean confidence level of each cell classification, wherein the mean confidence level generally represents the ability of the cell classifier model to correctly predict the cell label for a token based on the language embedding and the position embedding of the token, and is generated by calculating precision-recall curves on a sample dataset with known ground truth (known as validation dataset). For example, for some embodiments of the cell classifier model comprising the value table cell sub-classifier, the mean confidence of the cell label "background" may be around 0.9409, of the cell label "unit of measure" may be around 0.89670, of the cell label "parameter" may be around 0.9504, of the cell label "value" may be around 0.9631, of the cell label "sampling frequency" may be around 0.9252, of the cell label "sample type" may be around 0.9613 and of the cell label "type of measure" may be around 0.8920. In embodiments of the cell classifier model comprising the requirement table cell sub-classifier, the mean confidence of the cell label "citation" may be around 0.9370, of the cell label "requirement" may be around 0.9164 and of the cell label "background" may be around 0.9279. The cell classifier model may classify a particular a token with a particular cell label when a probability for that particular cell label is above a threshold confidence based on the mean confidence, such as within three standard deviations of the mean confidence for example. For example, in some embodiments of the value table cell sub-classifier, the threshold confidence of the cell label "background" may be around 0.6269, of the cell label "unit of measure" may be around 0.5139, of the cell label "parameter" may be around 0.6466, of the cell label "value" may be around 0.6920, of the cell label "sampling frequency" may be around 0.5783, of the cell label "sample type" may be around 0.8720 and of the cell label "type of measure" may be around 0.6026. In some embodiments of the requirement table cell sub-classifier, the threshold confidence of the cell label "citation" may be around 0.6941, the of the cell label "requirement" may be around 0.6235 and of the cell label "background" may be around 0.6531.

The cell classifier 210 may then continue to block 216, which includes codes directing the processor 110 to post-process the initially generated cell classification to confirm or flag it. In the embodiment shown, block 216 may direct the processor 110 to assign different threshold probabilities for each cell label depending on relevance of the cell label. For example, the cell label "value" generated by the value table cell sub-classifier may be categorized as a root label that is more favoured, while the cell label "background" may be categorized as a background label that is less favoured, such that if there is any uncertainty, the uncertainly is resolved in favour of the cell label "value" or against the cell label "background". In other embodiments, cell labels other than "value" (such as the cell label "parameter" for example) may be categorized as a root label, and may be weighted more favourably. Similarly, the "citation" label generated by the requirement table cell sub-classifier may be classified as a root label that is more favoured than other labels generated by the requirement table cell sub-classifier, while the cell label "background" also may be categorized as a background label that is less favoured.

Additionally or alternatively, as each cell of the plurality of cells may be associated with more than one token of the plurality of tokens (associated at block 170 of the table processing codes 150 shown in FIG. 6 for example), block 216 may include codes directing the processor 110 to confirm a cell classification for particular cell using majority voting based on the cell label generated for each token which is associated with that cell. For example, referring to FIG. 3A, "Reactor Distillate Receiver T-23" in one particular cell may be tokenized into nine tokens "reactor", "di", "##sti", "##lla", "##te", "receiver", "T", "-" and "23". If the cell classifier model generates a specific cell label for five or more of these nine tokens (such as "equipment identifier" for example), then block 216 may direct the processor 110 to apply that cell classification to that particular cell, irrespective of whether one of these tokens has another cell label (such as "value" for example). For example, the tokens "reactor", "di", "##sti", "##lla", "##te", "receiver", "T", "-" may be classified with the cell label "equipment identifier", while the token "23" may be classified with the cell label "value" at block 214, and block 216 may direct the processor 110 to classify the corresponding cell as an "equipment identifier" cell as a majority of the tokens associated with the cell includes the cell label "equipment identifier".

Additionally or alternatively, block 216 may also include codes directing the processor 110 to combine adjacent tokens classified with a same cell label into a combined token. For example, referring to FIG. 3A, the tokens token "reactor", "T", "-", "1" and "S" all labelled with the cell label "parameter" may be combined into a combined token "Reactor T-1S" labelled with the cell label "parameter". Additionally, referring to FIG. 3B, the tokens "total", "residual", "ch", "##lor", and "##ine" all labelled with the cell label "parameter" may be combined into a combined token "total residual chlorine" labelled with the cell label "parameter".

Additionally or alternatively, in some embodiments, a single word in a cell may be formed of more than one token. For example, referring to FIG. 3A, the word "distillate" may be tokenized into four tokens "di", "##sti", "##te" and the word "T-23" may be tokenized in three tokens "T", "-" and "23". Similarly, referring to FIG. 3B, the word "chlorine" may be tokenized into three tokens "ch", "##lor", and "##ine". In certain embodiments, block 216 may include codes directing the processor 110 to confirm a cell label for particular word based on the cell label generated for each token forming that word, and then utilize the cell label for that word to determine or confirm the cell classification of the cell associated with that word as described above and below. For example, block 216 may determine that a larger word formed of numerous tokens exist based on space delimiters or based on sub-words being tokenized by the table processing codes 150. Block 216 may then determine the cell label for the word based on the cell label for a first token forming the word. For example, the word "distillate" may be labelled with the cell label "parameter" when the first token "di" forming the word is labelled with the cell label "parameter". Similarly, the word "chlorine" may be labelled with the cell label "parameter" when the first token "ch" forming the word is labelled with the cell label "parameter". Alternatively, block 216 may determine the cell label for the word based on majority voting of the tokens forming the word. For example, the word "distillate" may be labelled with the cell label "parameter" when more than two of the four tokens "di", "##sti", "##lla", and "##te" forming the word is labelled with the cell label "parameter". The word "chlorine" may be labelled with the cell label "parameter" when two or more of the three tokens "ch", "##lor", and "##ine" forming the word is labelled with the cell label "parameter".

In other embodiments, block 216 may include codes directing the processor 110 to classify a particular cell with different cell classifications based on the tokens which are associated with that cell, which generally functions to divide an original cell into different sub-cells with different cell classifications. For example, referring to FIG. 3B, as described above, the phrase "8.5 s.u." within one original cell may be tokenized into two tokens "8.5" and "s.u.". The first token "8.5" may be labelled with the cell label "value" and the second token "s.u." may be labelled with the cell label "unit of measure" by the cell classifier model. Block 216 may direct the processor 110 to classify the single original cell with both the cell label "value" and the cell label "unit of measure" such that the token "8.5" may be associated with a "value" sub-cell forming a portion of the original cell and the token "s.u." may be associated with a "unit of measure" sub-cell forming another portion of the original cell. Similarly, the phrase "0.019/0.013 mg/l" within one particular original cell may be tokenized into four tokens "0.019", "/", "0.013", and "mg/l".

The first to third tokens "0.019", "/", "0.013" may be labelled with the cell label "value" and the fourth token "mg/l" may be labelled with the cell label "unit of measure" by the cell classifier model. Block 216 may direct the processor 110 to classify the single original cell with both the cell label "value" and the cell label "unit of measure", such that the tokens "0.019", "/", "0.013" are associated with a "value" sub-cell forming a portion of the original cell and the token "mg/l" is associated with a "unit of measure" sub-cell forming another portion of the original cell. Similarly, referring to FIG. 5, "5,442 Average" within one original cell may be tokenized into two tokens "5,442" and "average". The token "5,442" may be labelled with the cell label "value" while the token "average" may be labelled with the cell label "type of measurement" by the cell classifier model. Block 216 may direct the processor 110 to classify the original cell with both the cell label "value" and the cell label "type of measure", such that the token "average" is associated with a "type of measurement" sub-cell forming a portion of the original cell, while the token "5,442" is associated with a "value" sub-cell forming another portion of the original cell.

Additionally or alternatively, block 216 may also include codes directing the processor 110 to confirm a cell classification for particular cell by using majority voting based on the cell classification generated for other cells in a same or corresponding column or a same or corresponding row of the table that cell belongs to (generally excluding cells in the column or row which are classified as a "background" cell or a "header" cell). For example, again referring to FIG. 3A, tokens representing "Reactor Distillate Receiver T-23" are associated with a first cell in column C (CC), tokens representing "Reactor T-15" are associated with a second cell in the same CC, tokens representing "Separator T-3S" are associated with a third cell in the same CC, tokens representing "Wiped Film Evaporator T-4S" are associated with a fourth cell in the same CC, tokens representing "Waste Acid Water Tank T-6S" are associated with a fifth cell in the same CC and tokens representing "THF Drum Filling Station T-6S" are associated with a sixth cell in the same CC. Block 216 may cause each of the first, second, third, fourth, fifth and sixth cells in CC to be classified with a particular cell classification (such as a "equipment identifier" cell example) when three or more of the first, second, third, fourth, fifth and sixth cells are classified with that particular cell classification, irrespective of whether another one of these cells have another cell classification (such as a "background" cell for example).

In certain embodiments and as described above, the cell classifier 210 may also transmit the generated cell classifications to the table classifier 130 (shown in FIG. 2) to enable the processor 110 to double-check or refine the table classifications generated by the table classifier 130 for the table. As described above, the cell classification generated by the cell classifier 210 may include cell labels which are exclusive to "value" tables or exclusive "requirement" tables. For example, the cell labels "value" and "parameter" may be exclusive to "value" tables, whereas the cell labels "citation" and "requirement" may be exclusive to "requirement" tables. In situations where the cell classifier 210 classifies one or more cells within a particular "table" region of interest as a "value" cell, the table classifier 130 may automatically classify the "table" region of interest as a "value" table, as "value" cells are unlikely to occur in "requirement" tables. Similarly, where the cell classifier 210 classifies one or more cells within a particular "table" region of interest as a "citation" cell, the table classifier 130 may automatically classify that particular table as a "requirement" table, as "citation" cells are unlikely to occur in "value" tables. Where the table classification generated by the table classifier 130 changes as a result of the cell classification transmitted by the cell classifier 210, the processor 110 may repeat one or more blocks of the table processing codes 150 or repeat one or more blocks of the cell classifier 210. The cell classifier 210 then ends.

Figure 8:
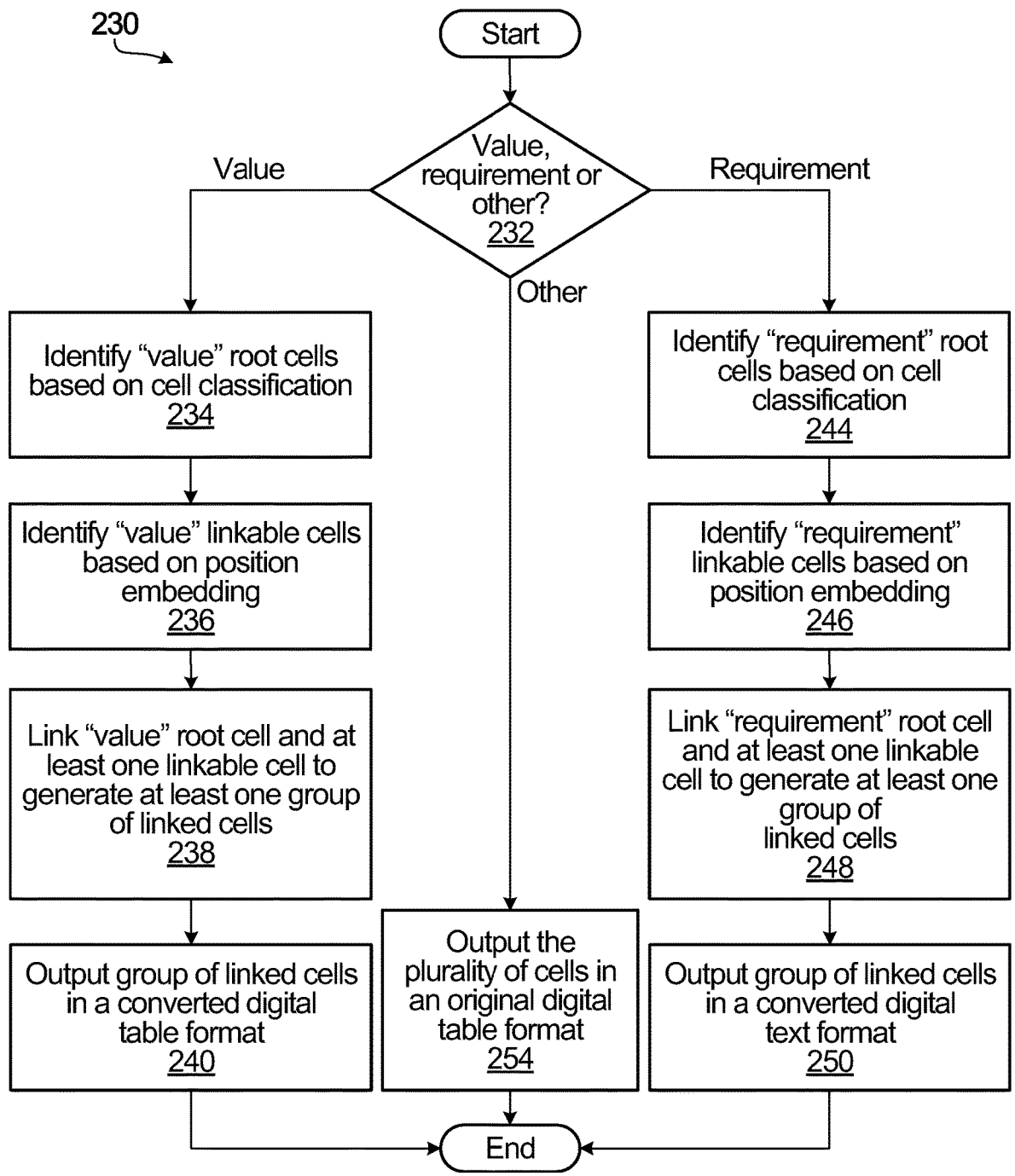
FIG. 8 is a schematic representation of codes of a cell relationship identifier stored in the program memory of the system of FIG. 1 according to one embodiment.

After the cell classifier 210 generates a cell classification for each cell (or for each sub-cell) of the plurality of cells in a "table" region of interest, the processor circuit 102 may initiate the cell relationship identifier 230 stored in the program memory 112, an embodiment of which is shown generally in FIG. 8. The cell relationship identifier 230 generally include codes for identifying relationships between the cells of the plurality of cells. In the embodiment shown, the cell relationship identifier 230 includes codes directing the processor 110 to identify relationships between the cells (or sub-cells) based on at least (a) the cell classification of each cell and/or each sub-cell (generated by the cell classifier 210 shown in FIG. 7 for example) and (b) position information associated with each cell, which may be the position embedding associated with tokens that are associated with the cell or the sub-cell (the position embedding generated at block 174 and the association generated at block 170 of the table processing codes shown in FIG. 6), the token bounding boxes (such as the token bounding box 294 shown in FIG. 3A, the token bounding box 374 shown in FIG. 3B, the token bounding box 324 shown in FIG. 4 and the token bounding boxes 404 and 405 shown in FIG. 5) of the tokens that are associated with the cell or the sub-cell, or the cell bounding boxes (such as the cell bounding box 284 shown in FIG. 3A, the cell bounding box 364 shown in FIG. 3B, the cell bounding box 314 shown in FIG. 4 and the cell bounding boxes 394 and 395 shown in FIG. 5 for example) of the cell. Generally, the position information associated with each cell or sub-cell indicates which cells or sub-cells belong to a same or corresponding column or a same or corresponding row of the table.

Referring to FIG. 8, the cell relationship identifier 230 begins at block 232, which includes codes directing the processor 110 to determine whether the plurality of cells with in a "table" region of interest belong to a "value" table, a "requirement" table or a "other" table. For example, block 232 may direct the processor 110 to retrieve the table classification of that table generated by the table classifier 130 (shown in FIG. 2). If the retrieved table classification is the "value" label, the processor 110 may determine that the plurality of cells belong to a "value" table, whereas if the retrieved table classification is the "requirement" label, the processor 110 may instead determine that the plurality of cells belong to a "requirement" table.

If at block 232, the cell relationship identifier 230 determines that the plurality of cells belong to a "value" table, the cell relationship identifier 230 continues to block 234, which includes codes directing the processor 110 to identify one or more cells or sub-cells of the plurality of cells within the "value" table which are classified with a root label as a root cell. The identification of the root label is based on the cell classification of each cell (or sub-cell) generated by the cell classifier 210 (shown in FIG. 7). In certain embodiments, the root label is the cell label "value", and each cell or sub-cell classified as a "value" cell may be identified as a root cell. In other embodiments, the root label may be another cell label, such as the cell labels "parameter" or "equipment identifier" for example. Referring to FIG. 3A, block 234 may direct the processor 110 to identify each of the cells containing tokens representing the values "1.25", "1700", "2.5", and "800" and classified "value" cells by the cell classifier 210 as the root cells. Referring to FIG. 3B, block 234 may include codes identifying each of cells or sub-cells containing the tokens (or combined tokens) representing the values "6.0", "8.5", "45.0", "monitor", "1.0", "0.019/0.013", and "0.011/0.0075" and classified as "value" cells or as "value" sub-cells as root cells. Referring to FIG. 5, block 234 may include codes for identifying each of the cells or sub-cells containing the tokens representing the values "5,442", "12,650", "6.0", "9.0", "monitor", "6.18", "6.93", "12.1" and classified as "value" cells or as "value" sub-cells as a root cell.

The cell relationship identifier 230 then continues to block 236, which includes codes for directing the processor 110 to identify cells or sub-cells which are linkable to the root cell, based on the position information associated with each cell or sub-cell—such as the position embedding associated with tokens that are associated with the cell or sub-cell, the token bounding boxes of the tokens that are associated with the cell or sub-cell, or the cell bounding box of the cell. In embodiments where the root cell comprises a "value" cell, a linkable cell may comprise a "time span" cell, a "parameter" cell, an "equipment identifier" cell, a "background" cell, a "header" cell, a "unit of measurement" cell, a "type of measurement" cell, a "sample type" cell, a "protocol identifier" cell, and a "sampling frequency" cell for example. In certain embodiments, block 236 may direct the processor 110 to identify each cell or sub-cell with position information indicating that the cell or sub-cell belongs to a same or corresponding column or a same or corresponding row as the root cell as linkable cells. Referring to FIG. 3A, for the "value" root cell containing "1.25" located at column E (CE) and row 4 (R4), block 236 may direct the processor 110 to identify all cells within CE and all cells within R4 as linkable cells. For example, the cells containing "T-1 E", "T-1C", "Separator T-3S", "tetrahydrofuran" and "1700" may be identified as linkable cells belonging the same R4, whereas cells containing "lb/hr" and "2.5" may be identified as linkable cells belonging to the same CE. Referring to FIG. 3B, for the "value" root sub-cell containing "8.5", located at column D (CD) and row 4 (R4), block 236 may direct the processor 110 to identify all cells and sub-cells within CD and within R4 as linkable cells. For example, the cells and sub-cells containing "s.u.", "6.0", "pH", "1/month" and "grab" may be identified as linkable cells belonging to the same R4, while the cells and sub-cells containing "discharge limitations", "daily maximum", monitor", "s.u.", "45.0", "mg/l", "0.019/0.013", "1.0" may be identified as linkable cells belonging to the same CD.

In embodiments where the tokens associated with a root cell is a part of a sub-cell forming a portion of an original cell, block 236 may direct the processor 110 to identify tokens associated with all other sub-cells forming a portion of the same original cell of the root cell as linkable cells. Referring to FIG. 3B, for the "value" root sub-cell containing "8.5" located at column D (CD) and row 4 (R4), block 236 may direct the processor 110 to identify the "parameter" sub-cell containing "s.u." which forms a portion of the same original cell as the root cell as a linkable cell belonging to the same original cell. Similarly, referring to FIG. 5, for the "5,442" root cell located at column E (CE) and row 6 (R6), block 236 may direct the processor 110 to identify the "type of measurement" sub-cell containing "average" which forms a portion of the same original cell as the root cell as a linkable cell belong to the same original cell. In other embodiments, block 236 may direct the processor 110 to identify linkable cells using a graph-based approach where key information associated with each cell of the table (such as position embeddings, language embeddings and image data for example) are presented as nodes and links between nodes are generated by a neural network. Nodes which are linked to a root cell node may be considered linkable cells.

The cell relationship identifier 230 then continues to block 238, which includes codes for directing the processor 110 to process the cell classifications of the linkable cells identified at block 236 to generate one or more groups of linked cells. Block 238 may direct the processor 110 to disregard linkable cells having certain cell classifications, including cell labels of "background" or "header" or cell classifications indicating another root cell. Referring to FIG. 3A, for the "1.25" root cell, the linkable cells containing the values "1700" and "2.5" and classified as "value" cells (another root cell) may be disregarded. Block 238 may direct the processor 110 to link together the remaining linkable cells and the root cell as a group of linked cells, such as ["T-1E", "T-1C", "Separator T-3S", "tetrahydrofuran", "1.25", "lb/hr"] as a group of linked cells for example. Referring to FIG. 3B, for the "8.5" root cell, the linkable cells and the linkable sub-cells containing the values "6.0", "monitor", "45.0", 0.019/0.013", "1.0" and classified as a "value" sub-cell (another root cell) may be disregarded and the linkable cells and sub-cells containing "discharge limitations" and classified as a "background" cell may also be disregarded. The remaining linkable cells and the "8.5" root cell may be linked together as a group of linked cells, such as ["8.5", "s.u.", "pH", "daily maximum", "1/month", "composite"].

Block 238 may also include codes directing the processor 110 to analyse the number of cell classifications of the linkable cells to determine a number of variables that should be associated with a particular root cell. Certain root cells within a "value" table may be associated with more variables than other root cells within that same "value" table. Referring briefly to FIG. 3A, the linkable cells for the "1.25" root cell includes a first cell containing "T-1E" classified as a "equipment identifier" cell by the cell classifier 210, a second cell containing "T-1C" classified as another "equipment identifier" cell, a third cell containing "Separator T-3S" classified as another "equipment identifier" cell, a cell containing "tetrahydrofuran" classified as a "parameter" cell and a cell containing "lb/hr" classified as a "unit of measure" cell. Block 238 may thus direct the processor 110 to associate the "value" root cell containing "1.25" with five variables consisting of three different "equipment identifiers", one "parameter" and one "unit of measure". Block 238 may also direct the processor 110 to generate a separate group of linked cells for each instance of a particular cell label. Again, referring to FIG. 3A, the "1.25" root cell is linkable to three different cells are classified as "equipment identifiers" cells (the first cell containing "T-1E", the second cell containing "T-1C" and the third cell containing "Separator T-3S"). Block 238 may include codes directing the processor 110 to generate three separate groups of linked cells for each "equipment identifier" cell, such as ["T-1E", "tetrahydrofuran", "1.25", "lb/hr"] as a first group of linked cells, ["T-1C", "tetrahydrofuran", "1.25", "lb/hr"] as a second group of linked cells and ["Separator T-3S", "tetrahydrofuran", "1.25", "lb/hr"] as a third group of linked cells for example. In other embodiments, block 238 may direct the processor 110 to generate a single group of linked cells which includes the closest instance of a particular cell label (by physical distance based on the position information associated with the tokens for example) or an instance of a particular cell label having a highest mean confidence. For example, referring to FIG. 3A, "1.25" root cell may only be linked to the third cell containing "Separator T-3S" to form a single group of linked cells ["Separator T-3S", "tetrahydrofuran", "1.25", "lb/hr"], as the third cell containing "Separator T-3S" is physically closest to the "1.25" root cell in the table 280.

The cell relationship identifier 230 then continue to block 240, which includes codes for directing the processor 110 to output each group of linked cells generated at block 238 in a structured machine-readable format for further processing. For example, in the embodiment shown in FIG. 9A, block 240 may direct the processor 110 to output each group of linked cells retrieved from the "value" table 280 shown in FIG. 3A in a converted digital table format 340. Specifically, each group of linked cells may be outputted as a row 342 in the converted table 340. The column headers 344 of the converted table 340 correspond to the variables associated with the root cell, namely the cell classifications of the cells or the sub-cells linkable to the value root cell (determined at block 238 for example). The number of variables associated with the root cell at block 238 (namely a number of cell classifications of linkable cells or of linkable sub-cells) determines a number of columns 346 of the converted table 340, and each column 346 includes the tokens of the group of linked cells corresponding to the cell classifications of that column 346. Similarly, in the embodiment shown in FIG. 9B, block 240 may direct the processor 110 to output each group of linked cells retrieved from the "value" table 360 shown in FIG. 3B in a converted digital table format 410. Each group of linked cells may be outputted as a row 412 in the converted table 410. The column headers 414 of the converted table 410 correspond to the cell classifications of linkable cells or linkable sub-cells associated with the root cell, and the number of cell classifications of linkable cells or linkable sub-cells associated with the root cell determines a number of columns 416 of the converted table 340. Each column 416 includes the tokens of the group of linked cells corresponding to the cell classification of that column 416. Finally, referring to FIG. 11, block 240 may direct the processor 110 to output each group of linked cells retrieved from the "value" table portion 390 shown in FIG. 5 in a converted digital table format 420. Each group of linked cells may be outputted as a row 422 in the converted table 420. The column headers 424 correspond to the cell classifications of linkable cells or linkable sub-cells associated with a root cell, and the number of cell classifications of linkable cells or linkable sub-cells associated with the root cell determines a number of columns 426 of the converted table 420. Each column 426 includes the tokens of the group of linked cells corresponding to the cell classification of that column 426. Block 240 may also direct the processor 110 to send each group of linked cells in the converted digital table formats 340, 410 and 420 to an environmental management information system (EMIS) such as Intelex or Intelex Assets and Compliance Tracking System (ACTS) for further processing and analysis.

In some embodiments, block 240 may also include codes directing the processor 110 to display each group of linked cells on a user interface to allow a user to easily determine the requirements of a regulatory content associated with a particular substance/material. For example, the user interface may allow a user to select a particular substance/material (retrieved from any linked cells or linked sub-cells classified as a "parameter" cell for example) to determine how to measure the substance/material (retrieved from any linked cells classified as an "equipment identifier" cell, a "unit of measure" cell, a "sample type" cell and a "protocol identifier" cell for example), when to measure the substance/material (retrieved from any linked cells or linked sub-cells classified as a "time span" cell, and a "sampling frequency" cell for example) and what the measured limit of the substance/material should be (retrieved from the root cells classified as "value" cells and any linked cells or linked sub-cells classified as labelled with the cell labels "value" and "type of measure" cells for example). The cell relationship identifier 230 then ends.

If at block 232, the cell relationship identifier 230 determines that the plurality of cells belong to a "requirement" table, the cell relationship identifier continues to block 244, which similar to block 234, includes codes directing the processor 110 to identify one or more cells or sub-cells of the plurality of cells classified with a root label as a root cell, based on the cell classification of each cell or sub-cell generated by the cell classifier 210 (shown in FIG. 7). In certain embodiments, the root label is the cell label "citation", and each cell or sub-cell classified as a "citation" cell may be identified as a root cell. Referring to FIG. 4, block 244 may include codes identifying each of the cells containing tokens representing "III.B.", "I.B.10.", "II.A.", "II.A.3.k.", "II.B.", "III. G.1. and III.H.", "V.B", and "V.C" and classified as "citation" cells as root cells. Referring to FIG. 5, block 244 may include codes identifying a combined token "general note" and "narrative non-trout" and classified as "citation" sub-cells as root cells. In other embodiments, the root label may be another cell label, such as the "requirement" label for example. Additionally or alternatively, block 244 may include codes for a hierarchical approach to determining the root cell. For example, block 244 may direct the processor 110 to initially identify cells or sub-cells classified as a "citation" cell as the root cell, but if a particular row of a "requirement" table does not include a "citation" cell, block 244 may direct the processor 110 to identify cells or sub-cells classified as a "requirement" cell as the root cell instead for that row instead.

The cell relationship identifier 230 then continues to block 246, which includes codes for directing the processor 110 to identify cells or sub-cells which are linkable to the root cell, based on the position information associated with each cell or sub-cell—such as the position embedding associated with tokens that are associated with the cell or sub-cell, the token bounding boxes of the tokens that are associated with the cell or sub-cell, or the cell bounding box of the cell. In embodiments where the root cell comprises a "citation" cell, a linkable cell may comprise a "requirement" cell, a "background" cell, or a "header" cell for example. In certain embodiments, similar to block 236, block 246 may direct the processor 110 to identify each cell or sub-cell associated with position information indicating that the cell belongs to a same or corresponding row as a root cell as linkable cells. Referring to FIG. 4, for the "III.B." root cell located at column (CB) and row 2 (R2), block 246 may include codes directing the processor 110 to identify all cells within R2 as linkable cells, such as the cells containing "Discharge Monitoring Reports (DMR)", "DMRs are due monthly and must be postmarked on or before the 20th of the month following the monitoring month.", "III.B.4", and "The DMR deadline is extendible by 20 days upon payment of extension fee." In embodiments where the tokens associated with a root cell is a part of a sub-cell forming a portion of an original cell, block 246 may direct the processor 110 to identify tokens associated with all other sub-cells forming a portion of the same original cell of the root cell as linkable cells. Referring to FIG. 5, for the "general note" root cell located at combined columns A-P (CA-CP) and row 5 (R5), the combined token "Existing discharge data from 2014 to May 6, 2019 was obtained from the application provided by the permittee. Ambient background data was collected as part of the application including a hardness of 29.3 mg/L, temperature of 12.1° C., and pH of 5.7. If seasonal limits apply, Summer is defined as June $1^{st}$ through October $31^{st}$ and Winter is defined as November $1^{st}$ through May $31^{st}$" is associated with a "requirement" sub-cell which forms a portion of the same original cell as the root cell. Block 246 may direct the processor 110 to identify the combined token associated with the "requirement" sub-cell as a linkable sub-cell of the "general notes" root cell. In other embodiments, block 246 may direct the processor 110 to identify linkable cells using a graph-based approach similar to that described above for block 236.

The cell relationship identifier 230 then continues to block 248, which includes codes for directing the processor 110 to analyse the cell classifications of the linkable cells identified at block 246 to generate one or more groups of linked cells. In certain embodiments, similar to block 238, block 248 may include codes directing the processor 110 to disregard linkable cells having certain cell labels, including "background" cells or "header" cells for example. Referring to FIG. 4, the cell containing "Discharge Monitoring Reports (DMR)" and classified as a "background" cell may be disregarded. Block 248 may include codes directing the processor 110 to link together the remaining linkable cells and the root cell as a group of linked cells. For example, referring to FIG. 4, the root cells and linkable cells ["III.B.", "DMRs are due monthly and must be postmarked on or before the 20th of the month following the monitoring month.", "III.B.4.", and "The DMR deadline is extendible by 20 days upon payment of extension fee."] may be linked together as a group of linked cells for example. In certain embodiments, block 248 may include codes directing the processor 110 to link only a single root cell with a single linkable cell in a 1:1 relationship. For example, referring to FIG. 4, the root cell and linkable cell ["III.B.", "DMRs are due monthly and must be postmarked on or before the 20th of the month following the monitoring month."] may be linked together as a first group of linked cells, while the root cell and linkable cell ["III.B.4.", and "The DMR deadline is extendible by 20 days upon payment of extension fee."] may be linked together as a second group of linked cells. Referring to FIG. 5, the linkable "requirement" sub-cell and the "general note" root cell may be linked together as ["general note", "Existing discharge data from 2014 to May 6, 2019 was obtained from the application provided by the permittee. Ambient background data was collected as part of the application including a hardness of 29.3 mg/L, temperature of 12.1° C., and pH of 5.7. If seasonal limits apply, Summer is defined as June $1^{st}$ through October $31^{st}$ and Winter is defined as November $1^{st}$ through May $31^{st}$"] the group of linked cells.

Block 248 may also include codes directing the processor 110 to determine whether more than one root cell is within the row. If there is more than one root cell within a same or corresponding row, a left-most first root cell is identified as a first-order root cell, a subsequent left-most root cell is identified as a second-order root cell, a further subsequent left-most root cell is identified as a third-order root cell, until there are no more root cells within that same or corresponding row. Any linkable cells between two root cells may be identified as linkable cells of a preceding root cell. For example, any linkable cells between the first-order and second-order root cells are linked to the first-order root cell as first-order linkable cells, any linkable cells between the second-order and third-order root cells are linked to the second-order root cell as second-order linkable cells, and so forth. As noted above, in certain embodiments, block 248 may include codes directing the processor 110 to link only a single root cell with a single linkable cell in a 1:1 relationship. Block 248 include codes directing the processor 110 to link together root cells and linkable cells within a same order to generate an order-based group of linked cells, and also link together the different order-based groups to generate groups of linked cells having a hierarchical relationship. Referring to FIG. 4, cells containing "III.B." and "III.B.4." in the same row 2 (R2) may both be classified as "citation" root cells, whereas cells containing "DMRs are due monthly and must be postmarked on or before the 20th of the month following the monitoring month." and "The DMR deadline is extendible by 20 days upon payment of extension fee." in the same R2 are both classified as "requirement" linkable cells. Block 248 may direct the processor 110 to determine that the cell containing "III.B." should be a first-order root cell and the cell containing "III.B.4." should be a second-order root cell, based on position information indicating that the cell containing "III.B." is further left than the cell containing "III.B.4.". Block 248 may also include codes directing the processor 110 to determine that the linkable cell containing "DMRs are due monthly and must be postmarked on or before the 20th of the month following the monitoring month." should be linked to the first-order root cell based on position information that the linkable cell is located to the left of the first-order root cell but to the right of the second-order root cell, while the linkable cell containing "The DMR deadline is extendible by 20 days upon payment of extension fee." should be linked to the second-order root cell based on position information that the cell is located to the left of the second-order root cell. As a result, two groups of linked cells may be generated at block 248: a first-order group of ["III.B.", "DMRs are due monthly and must be postmarked on or before the 20th of the month following the monitoring month."] and a second order group of ["III.B.4.", "The DMR deadline is extendible by 20 days upon payment of extension fee."]. The first and second-order groups of linked cells may then be linked together in a hierarchical relationship.

Figure 10:
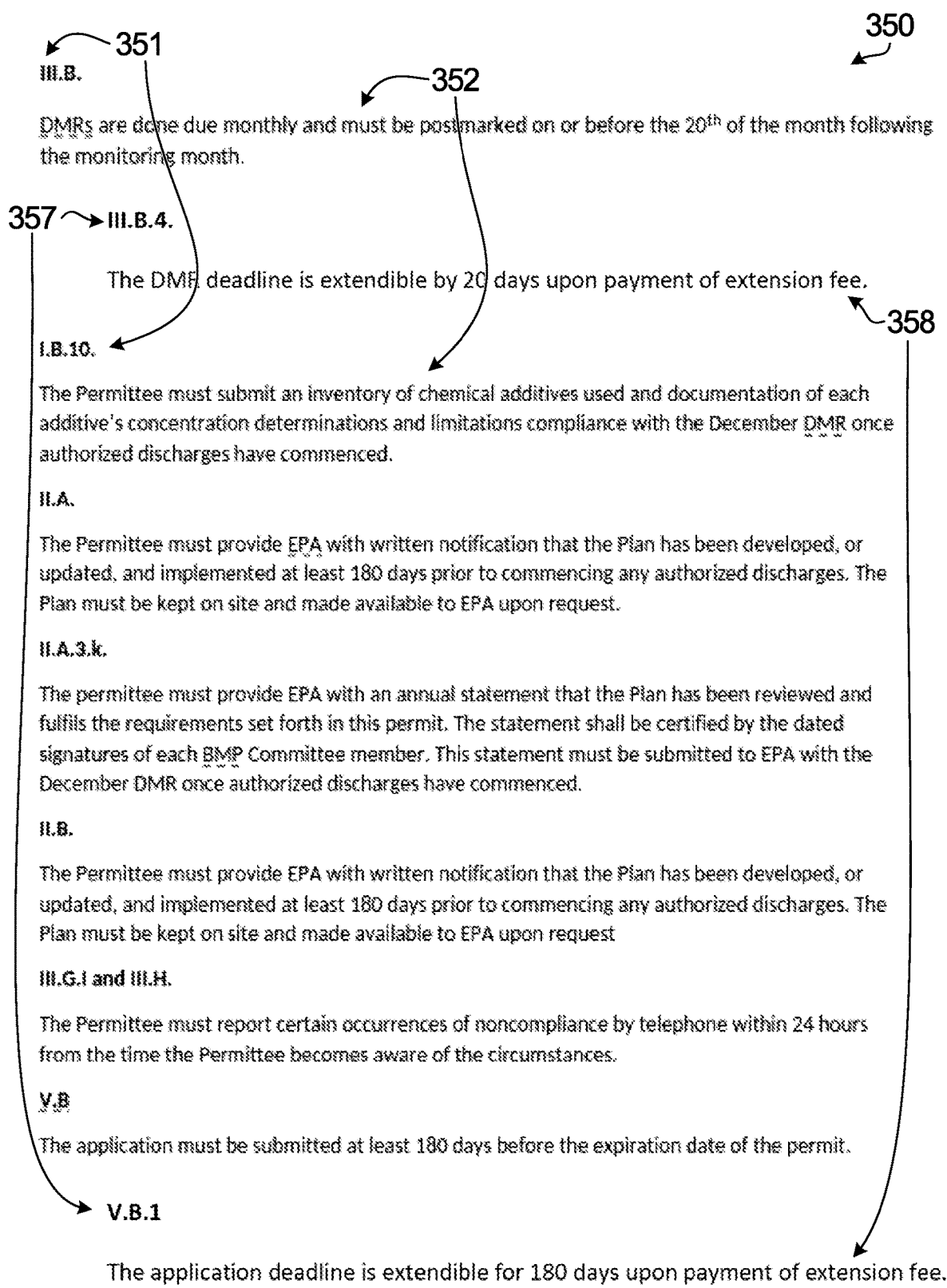
FIG. 10 is an output retrieved from the "requirement" table of FIG. 4 generated using the cell relationship identifier of FIG. 8 according to one embodiment.

The cell relationship identifier 230 then continues to block 250, which includes codes for directing the processor 110 to output each group of linked cells generated at block 248 in a structured machine-readable format for further processing. For example, referring to FIG. 10, block 250 may direct the processor 110 to output each group of linked cells retrieved from the "requirement" table 310 shown in FIG. 4 in a converted digital text format 350. In the converted text 350, each root cell may be outputted as a header 351 and 357 and each linkable cell may be outputted as a linked body 352 and 358. Block 250 may also include codes directing the processor 110 to output hierarchically linked groups of linked cells in a hierarchal structure, such that the first-order group of linked cells is a parent of any second-order group of linked cells and the second-order group of linked cells is a parent of any third-order group of linked cells, and so forth, where the hierarchal structure is indicated via indentation for example. Referring to FIG. 10, the first-order group of linked cell ["III.B.", "DMRs are due monthly and must be postmarked on or before the 20th of the month following the monitoring month."] is outputted as the second-order group of linked cell ["III.B.4.", "The DMR deadline is extendible by 20 days upon payment of extension fee."], such that the "III.B." root cell forms a first-order header 351 while the "III.B.4." root cell forms a second-order header 357, and their linked requirements cells form first-order and second-order bodies 352 and 358 respectively. The second-order header 357 may be indented relative to the first-order header 351 by a first amount and the second-order body 358 may also be indented relative to the first-order body 357 by the same first amount. In embodiments including a third-order group of linked cells, any third-order header may be indented relative to the second-order header 357 by the same first amount, but indented relative to the first-order header 351 by a larger second amount. Similarly, any third-order body may be indented relative to the second-order body 358 by the same first amount, but indented relative to the first-order body 352 by the larger second amount. The relative indentation of the headers and/or bodies may represent the hierarchical relationship between the different groups of link cells generated at block 248.

Similarly, referring to FIG. 11, block 250 may include codes directing the processor 110 to output each group of linked cells retrieved from the "requirement" table portion 391 shown in FIG. 5 in a converted digital text format 440. In the converted text 440, each root cell may be outputted as a header 441 and each linkable cell may be outputted as a body 442. In embodiments where one particular "table" region of interest includes portions categorized as both the "value" table 390 and the "requirement" table 391, the cell relationship identifier 230 may include codes directing the processor 110 to generate both the converted digital table format 420 for the portion categorized as the "value" table 390 and the converted digital text format 440 for the portion categorized as the "requirement" table 391.

Block 250 may, similar to block 240, direct the processor 110 to send each group of linked cells in the converted digital text format 350 and 440 to an EMIS system such as Intelex or Intelex ACTS for further processing and analysis. For example, each group of linked cells and the converted text 350 and 440 generated using the groups of linked cells may be analysed using the methods and the systems described in U.S. Pat. Nos. 10,956,673 and 11,314,922, commonly assigned, the entire disclosure of which is herein incorporated by reference. Block 250 may also, similar to block 240, direct the processor 110 to display each group of linked cells on a user interface to allow a user to easily determine the requirements of a regulatory content associated with a particular section of the regulatory content. For example, the user interface may allow a user to select a particular section of the regulatory content (retrieved from any root cells classified as a "citation" cell for example) to determine what the requirements associated with that particular section of the regulatory content are (retrieved from any linked cells or linked sub-cells classified as a "requirement" cell for example). The cell relationship identifier 230 then ends.

If at block 232, the cell relationship identifier 230 determines that the plurality of cells belong to a "other" table, the cell relationship identifier continues to block 254, which includes codes directing the processor 110 to output the plurality of cells of the "other" table in an original digital table format generally corresponding to an original format of the "other" table in the image data of the "table" region of interest. The original digital table format may be based on (a) the cell classification of each cell or sub-cell and (b) the position information associated with each cell or sub-cell, which may be the position embedding associated with tokens that are associated with the cell or sub-cell, the token bounding boxes of the tokens that are associated with the cell or sub-cell, or the cell bounding box associated with the cell. The cell relationship identifier 230 then ends.

The combination of the table classifier 130, the table processing codes 150, the cell classifier 210 and the cell relationship identifier 230 functions to generate a converted digital data format output (a linked group of cells in the converted digital table format 340, 410 and 420 or the converted digital text format 350 and 440 for example) of the words and characters within a table which is reflective of both (a) the format and physical layout of the table and (b) the aforementioned words and characters within the table. The converted digital data format output may allow presentation of the contents of the table in a manner that better assists in a user's understanding of the table and may allow a user to choose to display only certain portions of the table which are relevant for a user. The converted digital data format output may also assist subsequent computer-based analysis of the contents of the table, as the format and physical layout of the table is distilled down to a machine-readable linked groups of cells in the converted digital format.

While specific embodiments have been described and illustrated, such embodiments should be considered illustrative only and not as limiting the disclosed embodiments as construed in accordance with the accompanying claims.

Embodiments in which an exclusive property or privilege is claimed are defined as follows:

1. A computer-implemented method for extracting data from a table comprising a plurality of cells, the method comprising:
   receiving image data representing a physical layout of the table and words or characters in the table;
   generating a plurality of tokens, each token of the plurality of tokens representing a semantic unit of the words or characters;
   generating at least one language embedding and at least one position embedding associated with each token of the plurality of tokens, wherein the at least one language embedding comprises a semantic vector representation of a meaning of the semantic unit of the each token and the at least one position embedding comprises a position vector representation of a physical position of the each token in the physical layout of the table;
   associating at least one token of the plurality of tokens with a cell of the plurality of cells by:
      generating a token bounding box for each token of the plurality of tokens, the token bounding box representing a physical position of the each token in the physical layout of the table;
      generating a cell bounding box for each cell of the plurality of cells, the cell bounding box representing a physical position of the each cell in the physical layout of the table; and
      associating the token with the cell when a portion of the physical position represented by the token bounding box of the token overlaps a portion of the physical position represented by the cell bounding box of the cell;
   receiving the plurality of tokens at an input of a cell classifier trained to generate a cell classification for each cell of the plurality of cells based on the language embeddings and the position embeddings of the at least one token associated with the each cell; and
   determining a relationship exists between at least two cells of the plurality of cells based at least in part on the cell classifications and the position embeddings of the plurality of tokens.

2. The computer-implemented method of claim 1, further comprising linearizing tokens of the plurality of tokens associated with the cell of the plurality of cells.

3. The computer-implemented method of claim 1, wherein the at least one position embedding associated with each token comprises at least one of the token bounding box of the each token and the cell bounding box of the cell associated with the each token.

4. The computer-implemented method of claim 1, further comprising post-processing the plurality of cell bounding boxes to merge at least two cell bounding boxes when the physical position represented by a single token bounding box overlaps the physical position represented by the at least two cell bounding boxes.

5. The computer-implemented method of claim 1, further comprising receiving the image data representing the physical layout of the table at an input of a table classifier trained to generate a table classification for the table based on the image data, and wherein determining the relationship exists between the at least two cells further comprises determining the relationship exists between the at least two cells based at least in part on the table classification.

6. The computer-implemented method of claim 1, further comprising receiving the cell classifications at an input of a table classifier trained to generate a table classification for the table based at least in part on the cell classifications, and wherein determining the relationship exists between the at least two cells further comprises determining the relationship exists between the at least two cells based at least in part on the table classification.

7. The computer-implemented method of claim 5, wherein the table classification comprises at least a value table, a requirement table and an other table.

8. The computer-implemented method of claim 1, further comprising determining the relationship exists between the at least two cells when position information associated with a first cell of the at least two cells and position information associated with a second cell of the at least two cells represents that the first cell and the second cell are a part of a same or corresponding row and/or are a part of a same or corresponding column in the physical layout of the table.

9. The computer-implemented method of claim 8, wherein the position information associated with a cell comprises the position embedding of the at least one token associated with the cell.

10. The computer-implemented method of claim 1, further comprising determining the relationship exists between the at least two cells when the cell classification associated with a first cell of the at least two cells represents that the first cell is a linkable cell and the cell classification associated with a second cell of the at least two cells represents that the second cell is a root cell.

11. The computer-implemented method of claim 10, wherein the root cell comprises a value cell and the linkable cell comprises a time span cell, a parameter cell, an equipment identifier cell, a background cell, a header cell, a unit of measurement cell, a type of measurement cell, a sample type cell, a protocol identifier cell, and/or a sampling frequency cell.

12. The computer-implemented method of claim 10, wherein the root cell comprises a citation cell and the linkable cell comprises a requirement cell, a header cell and/or a background cell.

13. The computer-implemented method of claim 10, further comprising:
   linking the root cell and the linkable cell to generate a group of linked cells; and outputting the group of linked cells in a structured machine-readable format.

14. The computer-implemented method of claim 1, further comprising capturing the image data of the table.

15. A system for extracting data from a table comprising a plurality of cells based on image data representing a physical layout of the table and words or characters in the table, the system comprising:
   a table processor configured to:
      generate a plurality of tokens representing the words or characters in the table;
      generate at least one language embedding and at least one position embedding associated with each token of the plurality of tokens, wherein the at least one language embedding comprises a semantic vector representation of a meaning of the words or characters of the each token and the at least one position embedding comprises a position vector representation of a physical position of the each token in the physical layout of the table; and
      associate at least one token of the plurality of tokens with a cell of the plurality of cells by:
         generating a token bounding box for each token of the plurality of tokens, the token bounding box representing a physical position of the each token in the physical layout of the table;
         generating a cell bounding box for each cell of the plurality of cells, the cell bounding box representing a physical position of the each cell in the physical layout of the table; and
         associating the token with the cell when a portion of the physical position represented by the token bounding box of the token overlaps a portion of the physical position represented by the cell bounding box of the cell;
   a cell classifier configured to receive the plurality of tokens and trained to generate a cell classification for each cell of the plurality of cells based on the language embeddings and the position embeddings of the at least one token associated with the each cell; and
   a cell relationship identifier configured to determine a relationship exists between at least two cells of the plurality cells based at least in part on the cell classifications and the position embeddings of the plurality of tokens.

16. The system of claim 15, wherein the table processor is further configured to linearize tokens of the plurality of tokens associated with the cell of the plurality of cells.

17. The system of claim 15, wherein the cell relationship identifier is configured to determine the relationship exists between the at least two cells when position information associated with a first cell of the at least two cells and position information associated with a second cell of the at least two cells represents that the first cell and the second cell are a part of a same or corresponding row and/or are a part of a same or corresponding column in the physical layout of the table.

18. The system of claim 15, wherein the cell relationship identifier is configured to determine the relationship exists between the at least two cells when the cell classification associated with a first cell of the at least two cells represents that the first cell is a linkable cell and the cell classification associated with a second cell represents that the second cell is a root cell.

19. The system of claim 18, wherein the root cell comprises a value cell and the linkable cell comprises a time span cell, a parameter cell, an equipment identifier cell, a background cell, a header cell, a unit of measurement cell, a type of measurement cell, a sample type cell, a protocol identifier cell, and/or a sampling frequency cell.

20. The system of claim 18, wherein the root cell comprises a citation cell and the linkable cell comprises a requirement cell, a header cell and/or a background cell.

* * * * *